United States Patent
Ping Lu et al.

(10) Patent No.: US 12,498,329 B2
(45) Date of Patent: Dec. 16, 2025

(54) HETEROGENEOUS CHIPLET ID USING PHOTOLUMINESCENCE IN UASSEMBLER SYSTEM

(71) Applicant: Xerox Corporation, Norwalk, CT (US)

(72) Inventors: Jeng Ping Lu, Freemont, CA (US); Sourobh Raychaudhuri, Mountain View, CA (US); Eugene Michael Chow, Palo Alto, CA (US); Thomas Wunderer, Santa Cruz, CA (US); Patrick Yasuo Maeda, San Jose, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 42 days.

(21) Appl. No.: 18/529,372

(22) Filed: Dec. 5, 2023

(65) Prior Publication Data

US 2025/0180488 A1    Jun. 5, 2025

(51) Int. Cl.
*G01N 21/88* (2006.01)
*G01N 21/95* (2006.01)
*G06T 7/00* (2017.01)

(52) U.S. Cl.
CPC ..... *G01N 21/8806* (2013.01); *G01N 21/8851* (2013.01); *G01N 21/95* (2013.01);
(Continued)

(58) Field of Classification Search
CPC .......... G01N 21/6456; G01N 21/6489; G01N 2021/646; G01N 2201/0662
See application file for complete search history.

(56) References Cited

U.S. PATENT DOCUMENTS

| | | |
|---|---|---|
| 11,148,941 B2 | 10/2021 | Plochowietz et al. |
| 11,203,525 B2 | 12/2021 | Plochowietz et al. |

(Continued)

FOREIGN PATENT DOCUMENTS

KR    20230065514 A    *    5/2023

OTHER PUBLICATIONS

Translation of KR20230065514, Kim et al. Inspection Device Using Both White Light and Excitation Light, May 12, 2023 (Year: 2023).*

(Continued)

*Primary Examiner* — Thanh Luu
(74) *Attorney, Agent, or Firm* — Fleit Intellectual Property Law; Jose Gutman

(57) ABSTRACT

A machine vision system and method uses photoluminescence light response of micro-LEDs to identify types of micro-LEDs (e.g., red, green, or blue) that are used to assemble a micro-LED display. Excitation light (e.g., ultraviolet excitation light) in a certain wavelength range is illuminated on a random pool of heterogeneous micro-LEDs consisting of materials, for example, that photoluminesce in three different colors-red, green, or blue. The micro-LED is optically excited and will emit either red, green, or blue, photoluminescence light based on the type of the micro-LED. The machine vision system uses a camera device that includes color response sensors to differentiate the type of micro-LED. The orientation of the micro-LED can also be detected. The machine vision system, based on the type, location, and orientation of the heterogeneous micro-LEDs, provides image-data based optical feedback to a microassembler system to move the micro-LEDs on a planar working surface according to an electrostatic template.

10 Claims, 16 Drawing Sheets

(52) U.S. Cl.
CPC ...... *G06T 7/001* (2013.01); *G01N 2021/8835* (2013.01); *G01N 2021/8887* (2013.01); *G06T 2207/10064* (2013.01)

(56) References Cited

U.S. PATENT DOCUMENTS

| | | | |
|---|---|---|---|
| 11,242,244 | B2 | 2/2022 | Plochowietz et al. |
| 2013/0027543 | A1* | 1/2013 | Boeykens .......... G01R 31/2656 348/92 |
| 2019/0181184 | A1* | 6/2019 | Hu ........................ H10K 50/15 |
| 2022/0366579 | A1* | 11/2022 | Madara ................ G06T 7/0004 |
| 2024/0156348 | A1* | 5/2024 | Koopman .............. A61B 1/043 |

OTHER PUBLICATIONS

Boominathan, et al., "Recent advances in lensless imaging", Optica, vol. 9, Issue 1, pp. 1-16, 2022, https://doi.org/10.1364/OPTICA.431361.

Amann, S., Witzleben, M.v. & Breuer, S. 3D-printable portable open-source platform for low-cost lens-less holographic cellular imaging. Sci Rep 9, 11260 (2019). https://doi.org/10.1038/s41598-019-47689-1.

Moritex MTL Series, https://multipix.com/product/moritex-mtl-series-2/, Captured Nov. 14, 2023.

Beam shiftying Overview, https://www.optotune.com/beam-shifting, Captured Nov. 14, 2023.

4K DLP projectors is it real 4K? (XPR technology explanation), https://projectorjunkies.com/4k-dlp-projectors-is-it-real-4k-xpr-technology-explanation/, Captured Nov. 13, 2023.

* cited by examiner

TABLE 1

| Excitation Light | Photoluminescence Emission | | | Photoluminescence Emission | | |
| --- | --- | --- | --- | --- | --- | --- |
| | Epitaxial Layer Side Up | | | Epitaxial Layer Side Down | | |
| | Blue | Green | Red | Blue | Green | Red |
| 325nm | Yes | Yes | Yes | no | no | no |
| 405nm | Yes | Yes | Yes | Yes | Yes | Yes |
| 480nm | no | Yes | Yes | no | Yes | Yes |
| 550nm | no | no | Yes | no | no | Yes |

FIG. 14

HETEROGENEOUS CHIPLET ID USING PHOTOLUMINESCENCE IN UASSEMBLER SYSTEM

CROSS-REFERENCE TO RELATED APPLICATIONS

This application is related to the following two patent applications filed on even date herewith, 1) U.S. patent application Ser. No. 18/529,338, entitled "VISION SYSTEM FOR MICROASSEMBLER"; and 2) U.S. patent application Ser. No. 18/529,416, entitled "LENSLESS NEAR-CONTACT IMAGING SYSTEM FOR MICROASSEMBLY". These two patent applications, including the entirety of their written description and drawings, are collectively hereby incorporated by reference into the present patent application.

TECHNICAL FIELD

The present disclosure generally relates to machine vision systems, devices, and methods, and more specifically to a machine vision system for use with a microassembler system for inspection of the assembly of micro-objects and/or micro-scale devices such as micro-LEDs on a planar working surface.

BACKGROUND

Current machine vision systems used by microassembler systems frequently are required to identify heterogeneous (different types of) components such as micro-objects and/or micro-scale devices such as micro-LEDs (also referred to as chiplets) in a heterogeneous microassembly process. Large chiplets typically are marked with a special ID mark on the die which a machine vision system can readily identify thereby identifying the associated large chiplet and distinguishing between different types of large chiplets in an assembly process.

However, there is a strong commercial demand for continuous miniaturization of components such as chiplets for use in products. Further, the number of heterogeneous chiplets in a defined real estate over a planar surface area of a microassembler backplane for a product continues to increase (e.g., for a large display screen of a HD, Ultra HD, 4K, or 8K, display monitor with continuously increasing pixel count). As the chip size is continuously decreasing in the range of low tens of microns and lower, and the total heterogeneous component density continues to increase in a defined real estate over a planar surface area of a microassembler backplane, the optical resolution of a machine vision system to support microassembly of an increasingly large number of micro-objects and/or micro-scale devices closely spaced together is becoming a serious challenge for a machine vision system supporting optical feedback to a microassembler system. That is, it is becoming a serious challenge for a conventional machine vision system to see the details of any special ID marking on chip dies to identify the individual components, e.g., the micro-LED chips. This reduced ability to identify individual micro-components can detrimentally impact a manufacturing process reducing its commercial viability.

BRIEF SUMMARY

According to various embodiments of the invention, a machine vision system and a method therefor captures images of a working optical inspection region on a planar working surface in which a microassembler system manipulates and/or places micro-components, comprising a micro-object and/or a micro-scale device such as a micro-LED, (e.g., a chiplet) as part of a microassembly process. The working optical inspection region is illuminated (e.g., which in certain embodiments can be uniformly illuminated) with excitation light from at least one excitation light source optically coupled through a source optical train thereby passing and emitting light signals of the excitation light within an excitation light wavelength range while reducing intensity of light signals of the emitted excitation light outside of the excitation light wavelength range. The excitation light wavelength range is selected to cause certain micro-components on the planar working surface to emit photoluminescence light signals in response to being illuminated by the incident excitation light within the excitation light wavelength range.

A machine vision system, according to an example, can detect a photoluminescence response of individual micro-components, e.g., micro-LEDs, to identify different types of micro-components to provide optical image feedback to a microassembler system as part of a microassembly process. For example, a machine vision system can detect three different types of micro-LEDs (e.g., Red, Green, and Blue, color micro-LEDs) used to assemble a micro-LED display.

Ultraviolet (UV) light in a certain wavelength range, according to the example, can be excitation light illuminated (e.g., which in certain embodiments can be uniformly illuminated) onto a planar working surface of a microassembly backplane over a random pool of heterogeneous micro-LEDs, in which each micro-LED consists of materials that photoluminesce in either Red, Green, or Blue, color. Each micro-LED will be optically excited by the incident UV light in the certain wavelength range, and in response the micro-LED will emit Red, Green, or Blue, color luminescence light based on the type of micro-LED and the incident UV excitation light. For example, UV excitation light from alternative UV excitation light sources, or from alternative configurations of UV excitation light filter parameters filtering a broad wavelength range UV light from a UV light source, can provide emitted UV excitation light in one or more different UV excitation light wavelength ranges designed and selected to respectively excite different types of micro-LEDs. In response to the incident emitted UV excitation light, each respectively excited micro-LED can emit luminescence light in a luminescence light wavelength range based on the type of micro-LED and the incident UV excitation light.

According to various embodiments, the machine vision system can use a main feedback camera, or a dedicated chiplet ID camera, that has a color response to differentiate emitted luminescence light from each micro-LED as one of the three types of color, i.e., R, G, B.

According to certain embodiments, the machine vision system can use one or more detection filters (e.g., bandpass filters) in a receiving optical train optically coupled to a camera device. A detection filter can be configured to pass received luminescence light, emitted from the micro-LEDs, in a predefined detection light wavelength range associated with one of the different R, G, B luminescence light wavelength ranges. The detection filter also reduces received light signals that are outside of the predefined detection light wavelength range.

In accordance with certain embodiments, a machine vision system can identify horizontal orientation of individual micro-LEDs on the planar working surface. A machine vision system, according to various embodiments, can identify vertical orientation of individual micro-LEDs on the planar working surface. Vertical orientation can also be referred to as right-side-up orientation or up-side-down orientation of a micro-LED (e.g., of a chiplet).

For example, the machine vision system can compare a first captured image from an optical module FOV region on the planar working surface to a second captured image from the same optical module FOV region. The first captured image, in the example, is captured based on the optical module FOV region being illuminated with UV excitation light while the second captured image is captured based on the same optical module FOV region being illuminated with white visible or NIR (near-infrared) light. In alternative embodiments, the first captured image is captured based on the optical module FOV region being illuminated with a first UV excitation light in a first wavelength range while the second captured image is captured based on the same optical module FOV region being illuminated with a second UV excitation light, in a second wavelength range different from the first wavelength range.

A machine visions system, for example, can compare the first captured image to the second captured image, and optionally perform certain image processing operations on one or both of the captured images, to determine the location of, and orientation of, individual micro-LEDs on the planar working surface.

According to a second example, the machine vision system can perform image processing operations and overlay (combine) the first captured image and the second captured image to generate a composite image of the optical module FOV region on the planar working surface. The machine vision system can then perform certain image processing operations on the composite image to determine the location of, orientation of, and the type of, individual micro-LEDs on the planar working surface. For example, the machine vision system can compare the captured first image in the composite image to the captured second image in the composite image, to identify at least one of: the location, the orientation, or the type, of individual micro-LEDs on the planar working surface.

The machine vision system thereby can provide image-data based optical feedback signals to a micro-assembler system, for example, to identify the type of micro-LEDs, their individual micro-LED location on a planar working surface, and their individual micro-LED orientation thereon, according to a dynamic electrostatic template. Based on the information associated with the dynamic electrostatic template, the micro-assembler system can move the micro-LEDs to desired target locations and/or to desired orientations on the planar working surface.

According to various embodiments, a machine vision system uses high resolution telecentric, or non-telecentric, machine vision macro lenses with high pixel count large format sensors, e.g., equivalent to 20 to 65 megapixels, at magnifications that increase the native resolution of the machine vision system while allowing the field-of-view (FOV) of the machine vision system to be large enough relative to the optics and cameras to enable side-by-side, feathered or staggered stitching of captured images from individual optical modules to produce an overall machine vision system FOV on the working planar surface.

Certain examples of the disclosure increase the space-bandwidth product beyond conventional imaging systems by using high-resolution cameras with large format high pixel-count sensors with magnifications that allow the combination of individual imaging systems with individual system field-of-views to create a machine vision system with a large overall vision system field-of-view and that uses various optical and imaging methods and techniques to increase the effective resolution over the large overall vision system field-of-view.

According to certain embodiments, the effective resolution of the overall FOV of the machine vision system can be further improved by using at least one image processing tool selected from the following list: microlens arrays, grayscale imaging, super-resolution imaging, and pixel shifting.

Certain embodiments, for example, include cameras using a high-resolution machine vision macro lens comprising a magnification of 0.25× to 1.75× macro lens optical systems with up to 2" format 20 MP to 65 MP image sensors with 2-micron to 4-micron pixel pitch value that create images that can be stitched in side-by-side, feathered or staggered geometries, to form the overall field-of-view of the machine vision system. In some embodiments, a receiving optical train can include a telecentric high-resolution machine vision macro lens comprising a magnification of 0.25× to 1.75× macro lens.

Features and advantages of the above-described machine vision system and method suitable for use with a microassembler system will become readily apparent from the following description and accompanying drawings.

All references, publications, patents, and patent applications, cited herein and/or cited in any accompanying Information Disclosure Statement (IDS), are hereby incorporated herein by reference in their entirety for all purposes.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to illustrate various examples and to explain various principles and advantages all in accordance with the present disclosure, in which:

FIG. 14 is a table (Table 1) showing different excitation light emissions and photoluminescence light emissions in an example machine vision system to identify different types of micro-components on a planar working surface thereby provide optical feedback signals to a microassembler system as part of a microassembly process, according to the disclosure.

DETAILED DESCRIPTION

Figure 1:
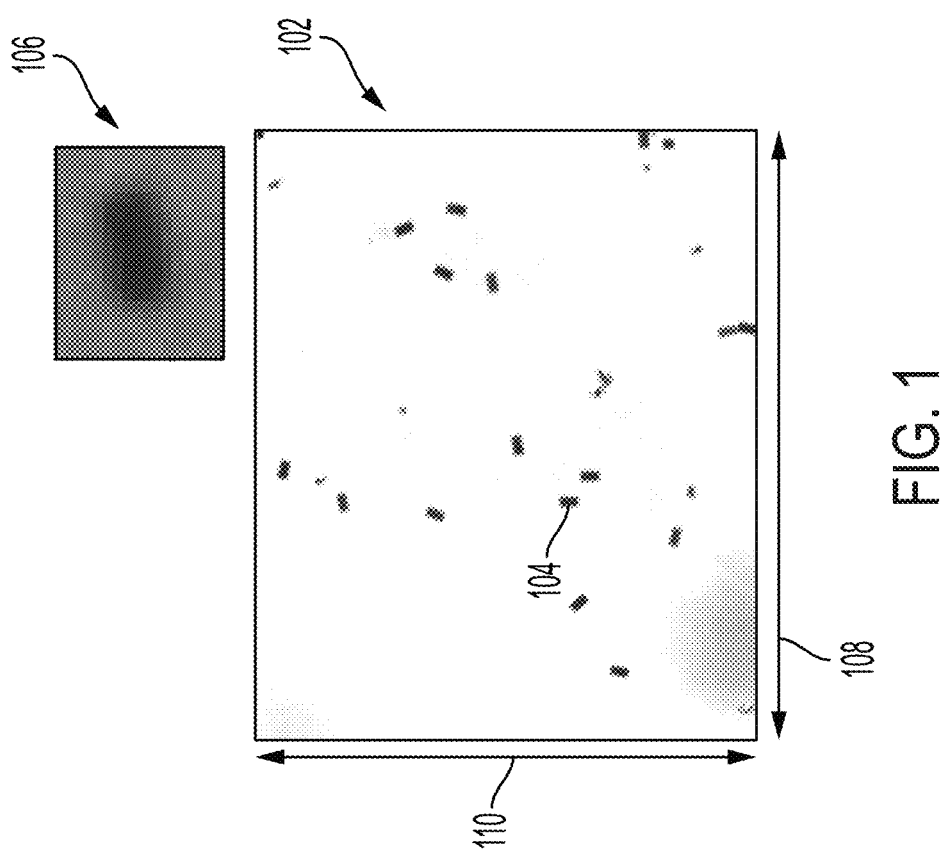
FIG. 1 is an illustration of an example machine vision system view of a working optical inspection region on a planar working surface viewed from above and showing a plurality of micro-objects and/or micro-LEDs located directly on the planar working surface, according to various examples of the present disclosure.

As required, detailed embodiments are disclosed herein; however, it is to be understood that the disclosed embodiments are merely examples and that the devices, systems, and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

Non-Limiting Definitions

The terms "microassembler system" or "microassembler", and the like, are intended to mean herein any configuration of equipment that is configured to process or perform any operation, e.g., a manufacturing operation, associated with assembling micro-objects and/or micro-scale devices in a working area on a generally planar working surface.

The term "micro-object" is intended to mean herein a small object or particle that may be used for various purposes in the manufacture and construction of various devices. Some assembly processes place a number of micro-objects into particular locations in a working area on a generally planar working surface.

The term "micro-scale device", which may also be referred to as a "chiplet", is intended to mean herein a micro-object that comprises a small device sized in a largest critical dimension generally at a micron level; and where such small device can be used for various purposes in the manufacture and construction of various devices. Some microassembly processes place a number of micro-scale devices into particular locations in a working area on a generally planar working surface. A non-limiting example of a micro-scale device is a micro-LED that can be assembled with other micro-objects and micro-scale devices in various locations in a working area on a generally planar working surface, such as to manufacture a display screen.

The term "target location" is intended to mean herein a location in a working area on a generally planar working surface into which a micro-object and/or micro-scale device is intended to be placed as part of a microassembly process.

The term "working area" is intended to mean herein an area on a generally planar working surface in which a microassembler system manipulates and/or places a micro-object and/or a micro-scale device as part of a microassembly process.

The terms "manipulate", "manipulating", and the like, are intended to mean herein a microassembler in a microassembly process imparting movement to a micro-object and/or micro-scale device in a working area on a generally planar working surface; such movement can include, but is not limited to, adjusting the position of, rotation of, alignment of, performing right-side-up verification of, at least one micro-object and/or micro-scale device in the working area.

The term "micro-object location sensor" is intended to mean herein any sensor device or apparatus that is able to detect locations of micro-objects and/or micro-scale devices within its range. In general, a micro-object location sensor is able to use any technique to determine locations of micro-objects.

The terms "image from a micro-object location sensor", "captured image", "image", and the like, are intended to mean herein in the context of a machine vision system any dataset that includes information indicating physical locations of micro-objects and/or micro-scale devices without regard to the format of that information or how the location information is indicated. In general, an image that contains images of micro-objects on the generally planar working surface includes any dataset that includes information indicating locations of micro-objects on the generally planar working surface, regardless of methods and technologies used to obtain that location data.

The term "module field of view region" is intended to mean herein a region on a planar working surface, where such region is associated with a field of view of an optical module.

The term "working field of view region" is intended to mean herein a machine vision system overall working region on a planar working surface, comprising one or more optical module field of view regions.

The term "microassembler backplane" is intended to mean herein a surface of a substrate structure or a device, adapted for use in a microassembly process performed by a microassembler coupled to a machine vision system incorporating the herein described systems and methods.

As used herein, "vertical" refers to a direction perpendicular to a surface of a substrate structure, such as perpendicular to a planar working surface of a microassembler backplane. As used herein, "horizontal" refers to a direction parallel to a surface of a substrate structure, such as horizontal to a planar working surface of a microassembler backplane.

Introduction

A machine vision system, according to various embodiments, provides image data based optical feedback signals to a microassembler system to identify location and orientation of individual micro-components (e.g., micro-LEDs) on a planar working surface of a microassembler backplane. With the image data feedback the microassembler system is capable of manipulating, positioning, orienting, and assembling, micro-objects and/or micro-scale devices (e.g., micro-LEDs) over a working area on the planar working surface of the microassembler backplane. A large working area for a machine vision system can be at least twelve (12) inches wide, as will be discussed in more detail below. The machine vision system can provide image-based feedback with a high resolution and a large overall machine vision system field-of-view (FOV) that can provide the imaging feedback to the microassembler system to manipulate, position, orient, and assemble, the micro-scale devices (e.g., micro-LEDs) over a large working area.

Micro-assemblers in some examples are a type of manufacturing equipment that operates to assemble products containing micro-objects by placing one or more micro-objects and/or micro-scale devices (e.g., micro-LEDs) into defined locations on a generally planar surface. Micro-objects in some examples are small objects or particles that may be used for various purposes in the manufacture and construction of various devices. In some examples, a micro-object may be an object that ranges in size from 1 micrometer to 500 micrometers, although other sizes are possible. The micro-objects are typically made up of dielectric materials that are neutral but polarizable. As a result, they experience electrostatic forces and undergo directed movement when they are subjected to a nonuniform electric field due to the interaction of the particle's dipole and spatial gradient of the electric field. This phenomenon is called dielectrophoresis. The micro-objects in other examples can also be charge encoded micro-objects or magnetic field pattern encoded micro-objects. For example, a micro-object may have a positive charge, may be charged with a specific pattern, may be encoded with a particular charge or magnetic field pattern, or combinations of these. The movement of charged micro-objects or particles under the influence of an electric field is called electrophoresis.

In the following description, a device that has a surface adapted for use in a microassembly process performed by a microassembler coupled to a machine vision system incorporating the herein described systems and methods can be referred to as a microassembler backplane. In some of the below described examples, micro-objects are manipulated on a generally planar surface of a microassembler backplane upon which they are to be placed by electrical potentials induced by conductive elements (e.g., electrodes) that are placed on or in proximity to the microassembler backplane. In examples, these conductive elements are coupled to an optical switch with a storage capacitor arranged in a manner similar to pixels across a display, i.e., in an array across the generally planar working surface onto which micro-objects are to be placed. In various examples, such arrangements are able to be uniform or, irregular, or a combination of both.

These conductive elements are able to be selectively activated by any suitable technique that creates an electric field on the surface of a micro-assembler backplane on which the micro-objects are placed. In an example, an electrical potential is able to be placed on an electrode in the micro-assembler backplane by activating a light activated switch, such as a phototransistor, that charges a storage capacitor whose output terminal provides a voltage source to that electrode. In an example, a microassembler backplane is able to have a configurable, time varying, electrical potential field applied across its array of electrodes by controlling a corresponding array of phototransistors and storage capacitors that connect each electrode to a voltage source. In an example, this array of phototransistors is able to be arranged on or in proximity to the microassembler backplane, such as on a surface that is opposite the surface onto which micro-objects are placed. Selective activation of electrodes in such an example is able to be achieved by illuminating the array of phototransistors with a variable light pattern that varies with time to illuminate selected phototransistors to cause a corresponding time varying electric field to be generated on the surface of the micro-assembler backplane on which micro-objects are placed. This configurable and time varying electrical potential allows micro-objects and/or micro-scale devices (e.g., micro-LEDs) to be moved and placed along the generally planar surface of the micro-assembler backplane by selectively projecting variable light patterns that are optical image control patterns.

A selected set of phototransistors, when exposed to light, are able to be used to switch one or more of a positive voltage, a negative voltage, and an AC voltage, to charge selected electrodes and capacitors on or in close proximity to the surface of the microassembler backplane. In an example, each of those electrodes contains a conductive element that is able to generate one or more of dielectrophoretic (DEP) and electrophoretic (EP) forces on the surface onto which micro-objects are to be placed. The DEP and EP forces may be used to manipulate single micro-objects or groups of micro-objects that may comprise functionally identical or distinct micro-objects.

Using a variable light pattern containing a control pattern to illuminate selected phototransistors allows the microassembler to precisely and quickly manipulate micro-objects and place them or orient them in specific locations, shapes, or patterns, according to a dynamic electrostatic template used by the microassembler. Control patterns which are able to be formed by an optical image that is projected onto the phototransistor array may be used to control the phototransistors or other devices that are able to control or generate an electric field (e.g., electrodes, transistors, phototransistors, capacitors, etc.). Control patterns contained in the variable light pattern in some examples indicate a voltage pattern that is to be formed across at least a portion of the microassembler backplane surface. Utilizing a light emitting device to generate optical image control patterns or voltage patterns allows a computing device to automatically form or place micro-objects into shapes or patterns. A camera and/or other micro-object location sensor is able to be used to determine the position and orientation of micro-objects on a microassembler backplane surface, such as by processing an image captured of that surface by a camera. In further examples, other devices may be used to detect the positions and orientations of micro-objects on the micro-assembler surface.

Various Examples of Machine Vision Systems And Methods

Referring to FIG. 1, an example machine vision system is viewing a working optical inspection region 102 (e.g., a working area) on a planar working surface viewed from above and showing a plurality of micro-objects and/or micro-LEDs 104 located directly on the planar working surface, according to various examples of the present disclosure. The working optical inspection region 102, which may also be referred to as a vision system working area, and the like, includes a plurality of heterogeneous micro-objects and/or micro-LEDs 104 located at various locations distributed over the planar working area 102 as shown. Working area 102 has a defined width 108 and a defined height 110 as shown. In this example, the micro-LED device 104 can be a 50 μm×25 μm image element 106 shown under 405 nm illumination light and at a magnification factor of approximately 0.625×.

Figure 2:
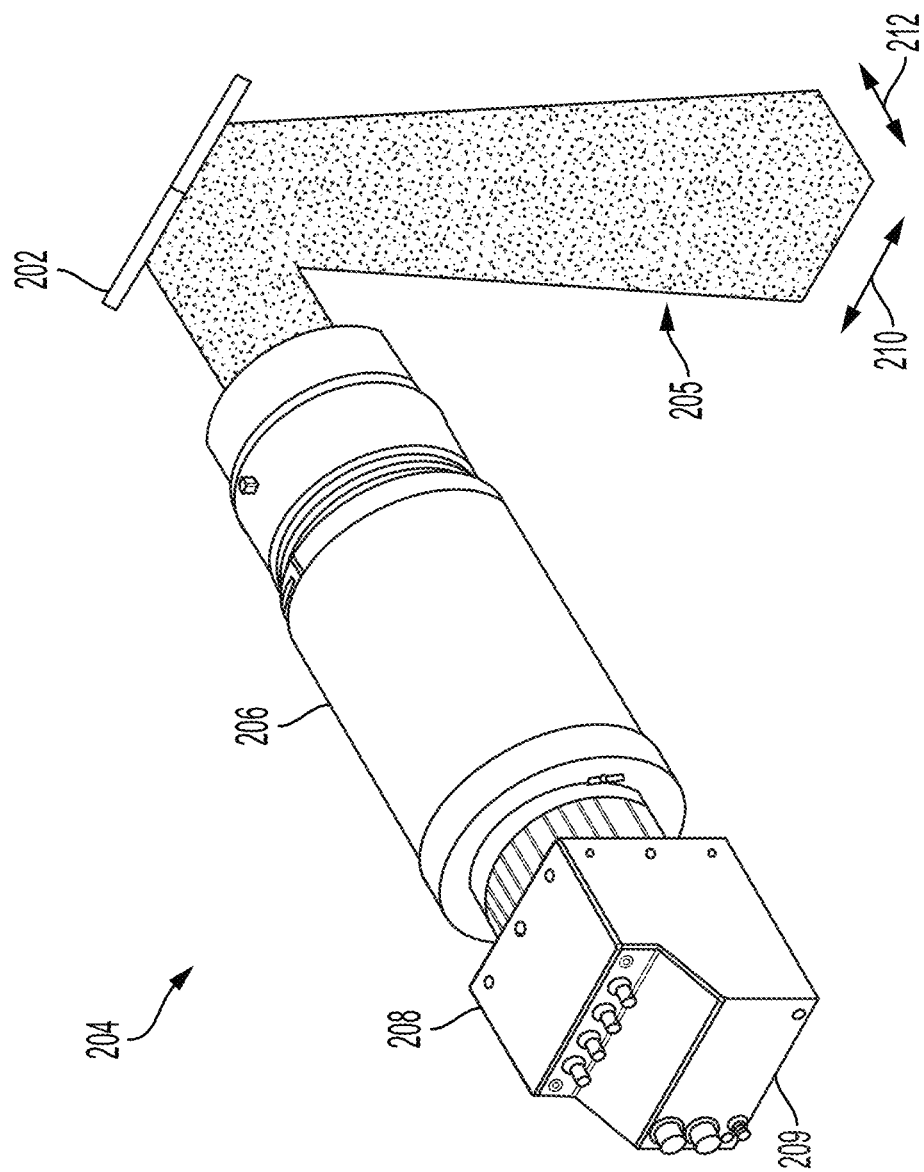
FIG. 2 is a perspective view of one individual optical image capture module (also referred to as "optical module") of the machine vision system of FIG. 1.

Referring to FIG. 2, an example individual optical image capture module (also referred to as "optical module", "IM", and the like) 204 of a machine vision system is arranged, in this example, to view from above the working optical inspection region 102 (see FIG. 1) on the planar working surface. It is understood that other arrangements of optical modules can view a working optical inspection region 102, according to various embodiments of the invention. For example, and not for limitation, one or more optical modules can be arranged below a planar working surface area of a microassembler backplane to view micro-objects and/or micro-scale devices (e.g., micro-LEDS) 104 disposed on the planar working surface.

The example individual optical module 204 includes an optical train coupling light signals 205 from a module FOV region on a planar surface, defined by width 210 and height 212 on the planar working surface, to one or more optical sensors 209 in a camera device 208. The optical train, in the example, includes one or more light reflective surfaces (e.g., one or more mirrors) 202 and one or more lenses 206 optically coupled with the camera device 208.

Figure 3:
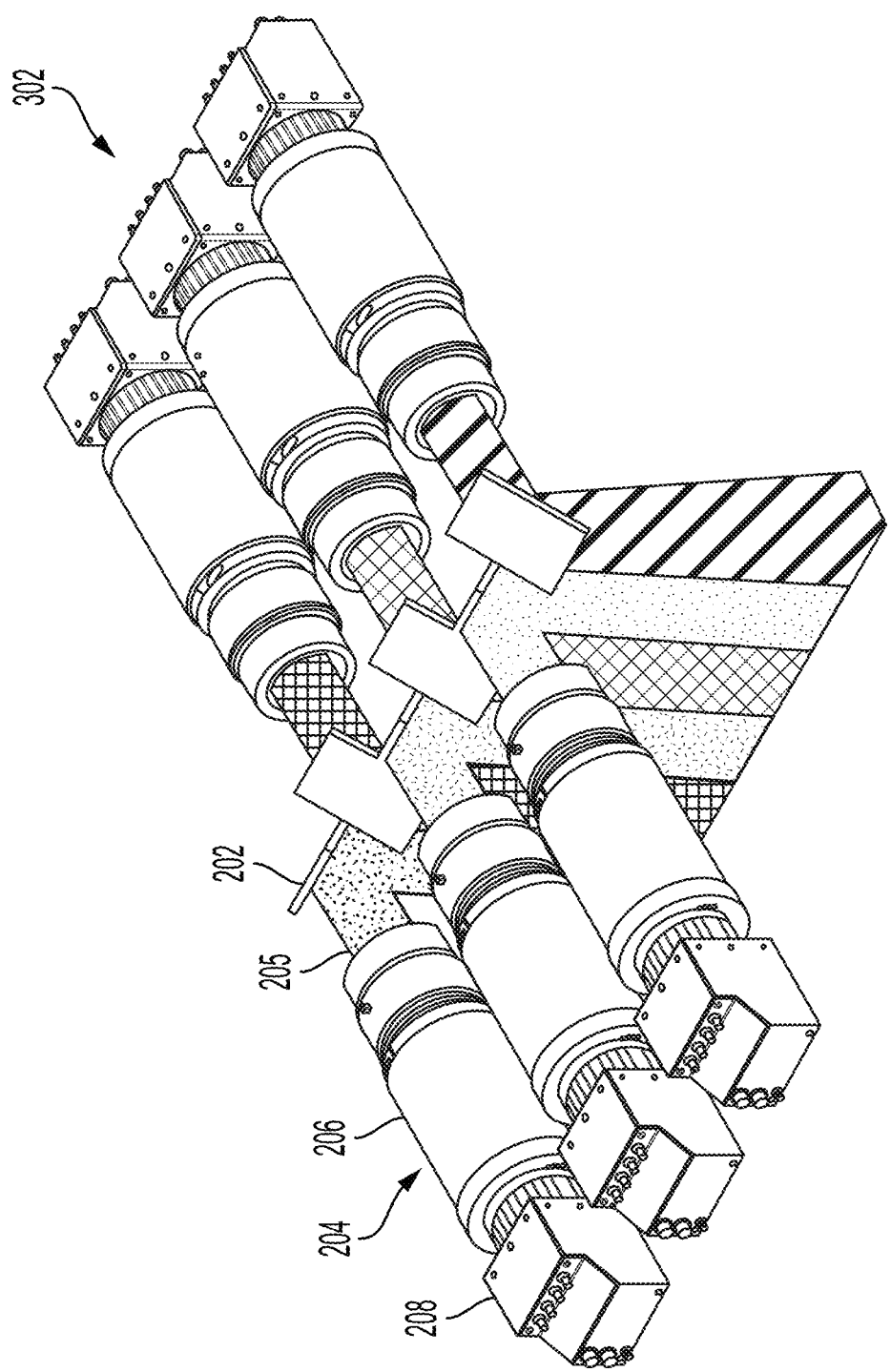
FIG. 3 is a perspective view of an example array of individual optical image capture modules (also referred to as "optical modules") of the machine vision system of FIG. 1, where the optical modules are arranged side-by-side in a feathered field-of-view (FOV) optical module array above the working optical inspection region on the planar working surface.

As shown in FIG. 3, according to an example implementation, the individual optical module 204 can be one of six individual optical image capture modules arranged collectively as an optical module array 302 of a machine vision system. In the example, the six individual optical modules are arranged side-by-side in a feathered field-of-view (FOV) optical module array 302 viewing from above the working optical inspection region 102 on the planar working surface. The optical modules in the feathered FOV optical module array 302 are arranged such that captured images by the individual optical modules can be stitched together in side-by-side staggered geometry where a plurality of FOV images of side-by-side optical modules touch or slightly overlap each other thereby a stitching operation can form a continuously captured image of a working region on the planar working surface from the captured plurality of FOV images.

In the example of FIG. 3, each of the six optical modules in the array 302 has an associated module FOV captured image arranged side-by-side touching or slightly overlapping another adjacent module FOV image thereby forming a row 108 of six module FOV images that stitched together form a continuously captured image of a row 108 in the working region on the planar working surface.

It should be noted that, according to various embodiments, a stitched-together staggered geometry of captured side-by-side images might not necessarily form a continuously captured image of a row 108 in the working region on the planar working surface. That is, FOV images from adjacent side-by-side optical modules may not touch or slightly overlap each other. However, the FOV images from adjacent side-by-side optical modules can represent relevant areas of the overall working region where are located micro-objects and/or microscale devices like micro-LEDs. These views and corresponding FOV images in a stitched-together staggered geometry are nonetheless useful to a microassembler system.

Lastly as shown in FIG. 3, each optical module in the array 302 includes an optical train which optically couples light signals in a field-of-view image from the planar working surface in the overall working region to one or more image sensors in a camera device in each optical module. Each optical train, in this example, includes one or more light reflective surfaces (e.g., one or more mirrors) that guide light signals from the planar working surface in the working region to the one or more image sensors in a respective camera device of an optical module.

Figure 4:
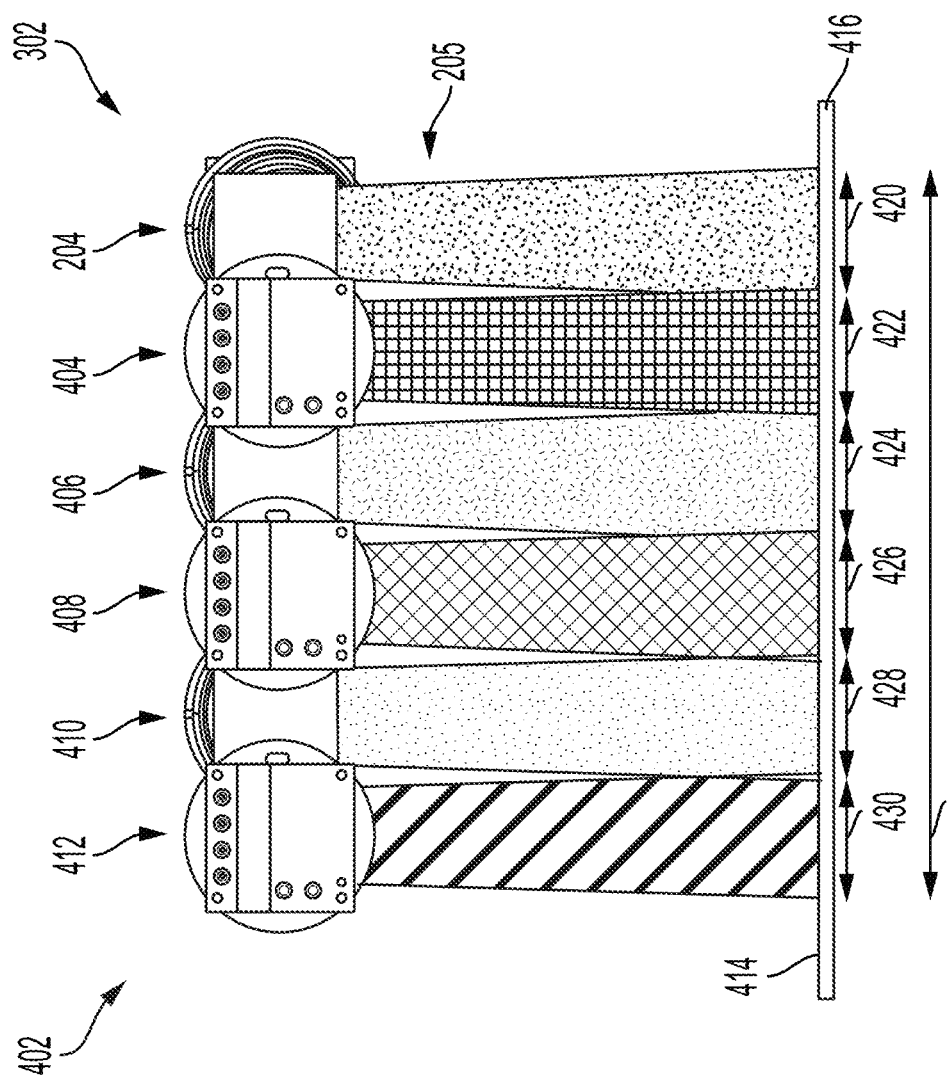
FIG. 4 is a rear planar view of the example feathered FOV optical module array illustrated in FIG. 3.

FIG. 4 is a rear planar view 402 of the example feathered FOV optical module array 302 shown in FIG. 3. The six optical modules 204, 404, 406, 408, 410, 412, are arranged side-by-side to capture from a planar working surface 414 of a microassembler backplane 416 six feathered FOV images 504, 506, 508, 520, 512, 514, (see FIG. 5) each captured image having a width 420, 422, 424, 426, 428, 430, arranged side-by-side touching or slightly overlapping adjacent FOV images in a row 108 along a width of the overall working region. The six FOV images, when stitched together form a continuously captured image of the row 108 on the planar working surface 414.

Figure 5:
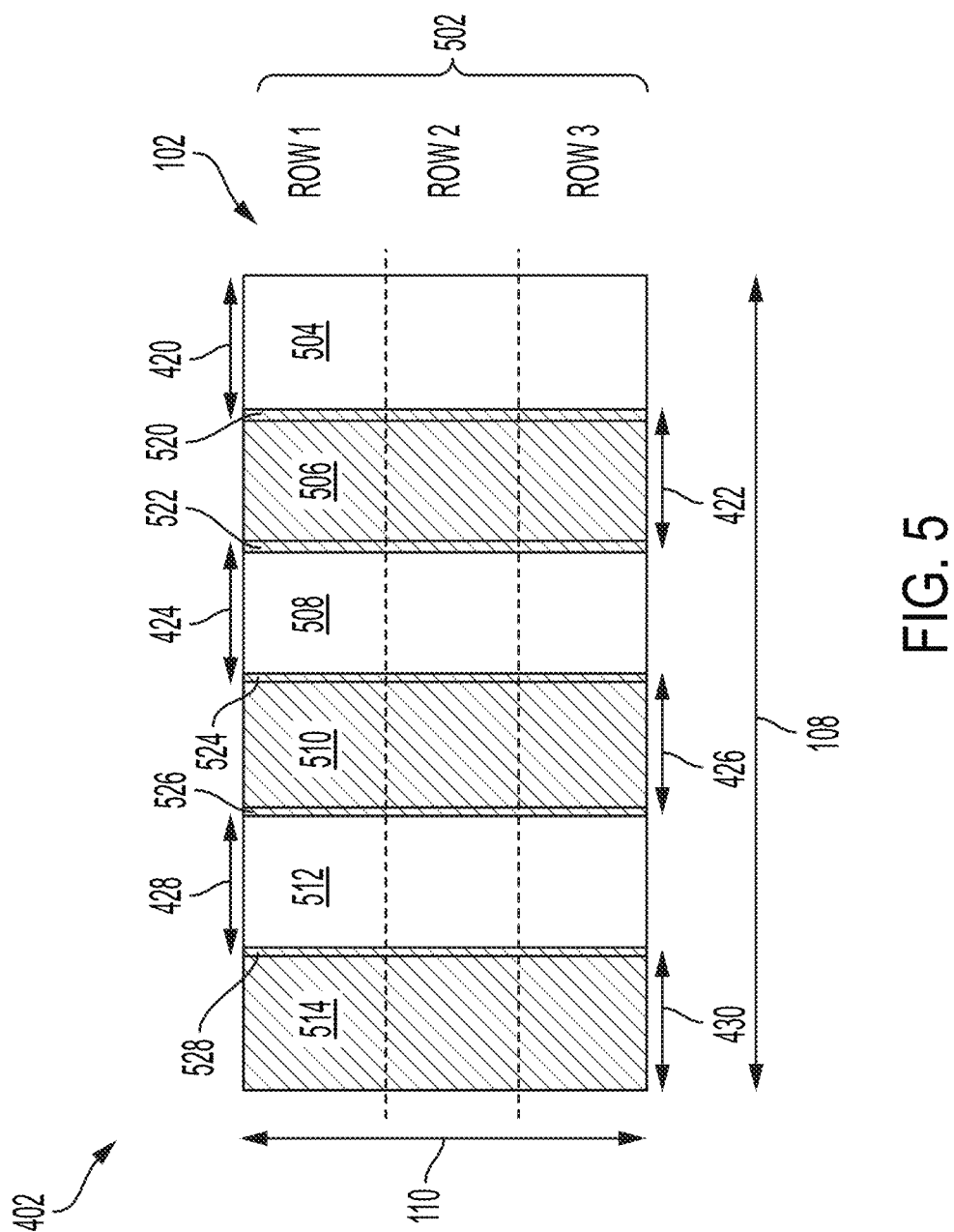
FIG. 5 is a top view of an example plurality of module FOV regions arranged in three rows by six columns on a planar working surface, from which to capture images by six individual optical modules arranged in a FOV optical module array such as shown in FIG. 3.

FIG. 5 is a top view 501 of the example six feathered FOV images 504, 506, 508, 520, 512, 514, arranged side-by-side touching or slightly overlapping 520, 522, 524, 526, 528, adjacent FOV images in row 108 along a width of the working region. The six feathered FOV images are captured three times by the set of six optical modules 204, 404, 406, 408, 410, 412, thereby forming stitched together three rows 502 along the height 110 of the working region 102, by six columns 420, 422, 424, 426, 428, 430, of feathered stitched images along the width 108 of the planar working surface 414 in the working optical inspection region 102.

As can be seen in FIG. 5, the adjacent FOV images 504, 506, 508, 520, 512, 514, have slight overlap areas 520, 522, 524, 526, 528, as shown. The machine vision system prepares the captured module FOV images 504, 506, 508, 520, 512, 514, for an adjacent image stitching operation, possibly performing image processing on individual captured module FOV images. For example, the machine vision system might adjust image resolution for a captured module FOV image to meet certain image resolution requirements, such as to enable a microassembler system to detect, identify, and move micro-objects and/or microscale devices located on the planar working surface based on the micro-objects and/or microscale devices being detected and identified in the captured module FOV image.

For example, the machine vision system analyzes the captured module field-of-view images and determines that a module FOV image 504 from one optical module 204 has a resolution that is too low for the machine vision system to adequately identify micro-objects and/or microscale devices in the module FOV image 504, while the other module FOV images 506, 508, 520, 512, 514, have original image resolutions that are adequate for the machine vision system to identify micro-objects and micro-scale devices. The machine vision system performs image processing on the low-resolution module FOV image 504 to adjust the image resolution to a higher resolution that is adequate for the machine vision system to identify the micro-objects and microscale devices. The machine vision system then performs further image processing by an image stitching operation in which the adjusted module FOV image 504, with its image resolution having been adjusted to a higher resolution, is stitched together with an adjacent module FOV image 506, with its original image resolution, and which is stitched together with the next adjacent module FOV image 508, with its original image resolution, and continuing the image processing until all captured images are stitched together. That is, the six captured images repeated over three rows 502 can be stitched together.

The stitching operation thereby forms an overall working FOV image that is the combination of all the captured module FOV images. The image resolution for the overall working FOV image is adequate for the machine vision system to identify micro-objects and microscale devices located in the overall working FOV image. In certain embodiments, a resolution of an overall working FOV captured image can be at least equal to or greater than the resolution of any module FOV captured image from a plurality of module FOV regions on the planar working surface 414. Additionally, in certain embodiments a width of an overall working FOV region on the planar working surface can be at least ten times larger than a width of any one module FOV region in the plurality of module FOV regions on the planar working surface.

Figure 6:
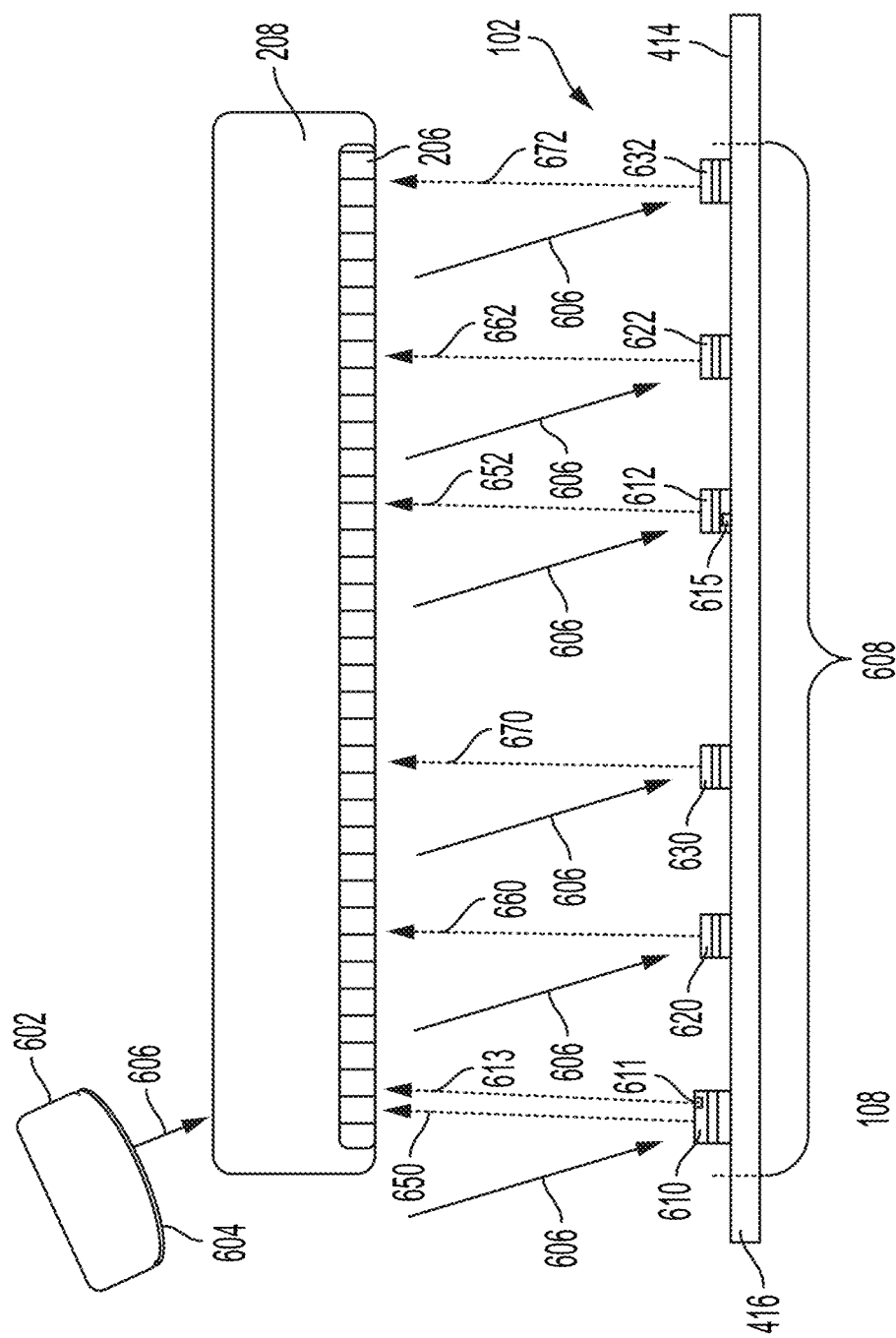
FIG. 6 is a side view of a first example machine vision system and method therefor; where in this example a random ensemble of red, green, and blue, micro-LEDs is disposed on a planar working surface, and where excitation light is illuminated on the ensemble and in response photoluminescence emissions from different micro-LEDs in the ensemble can be detected by an optical image capture module of the machine vision system thereby identifying location and orientation of individual micro-LEDs on the planar working surface.
Figure 11:
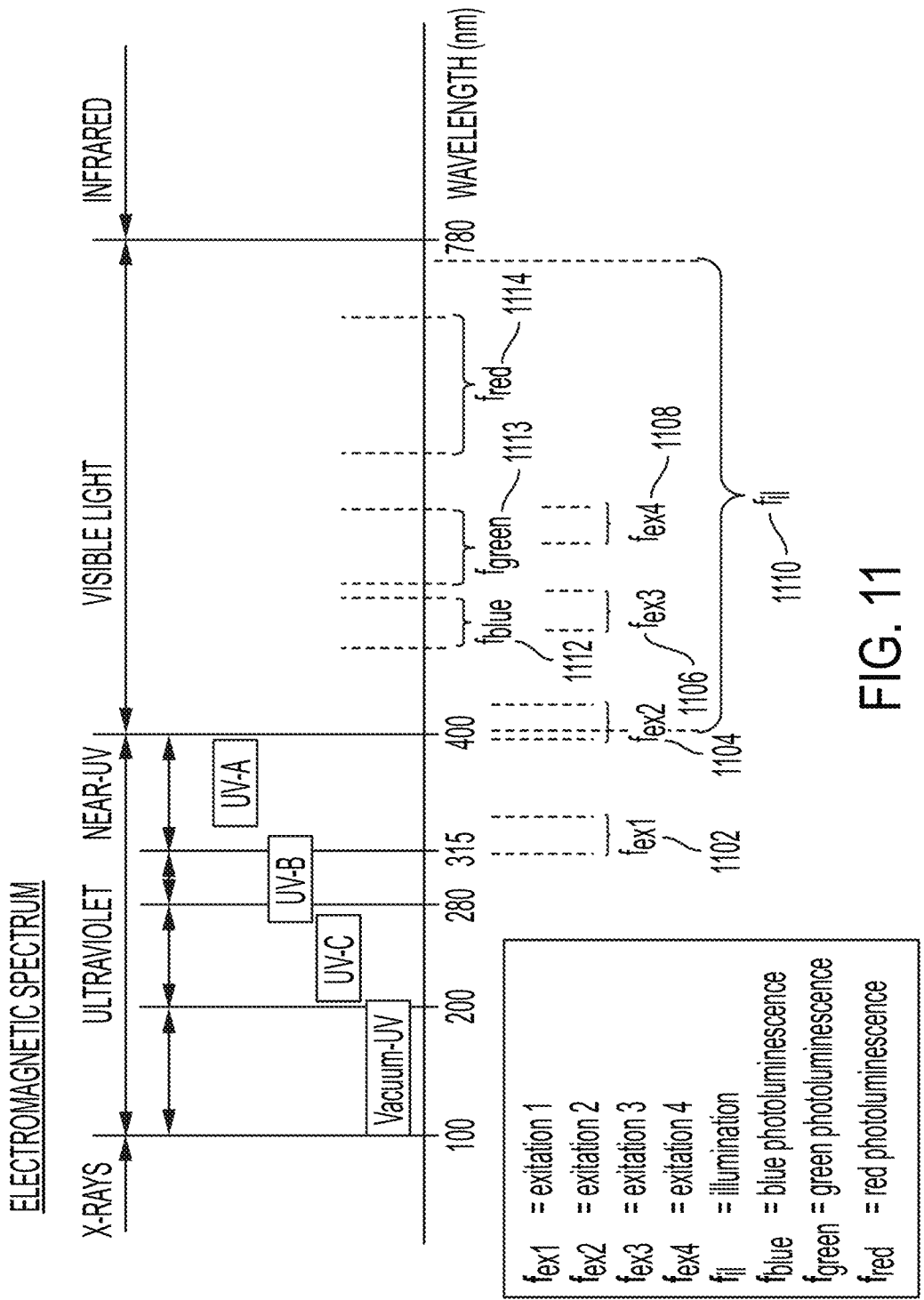
FIG. 11 is an electromagnetic spectrum diagram showing different wavelength ranges for light emissions that can be used by various examples of a machine vision system and methods therefor for a microassembler system to identify different types of micro-components on a planar working surface.

FIG. 6 is a side view illustrating a random ensemble 608 of green micro-LEDs 610, 512, blue micro-LEDs 620, 622, and red micro-LEDs 630, 632, disposed in an overall working region on a planar working surface 414 of a microassembler backplane 416. With reference to FIGS. 6 and 11, according to various embodiments, one or more excitation light sources 602, each optically coupled to an excitation light source optical train 604, can selectively emit excitation light 606 in a defined excitation light wavelength range.

Alternatively, a broad wavelength excitation light source 602 is optically coupled to an excitation light source optical train 604 that includes one or more excitation light filter lenses. The excitation light filter lenses can be selectively configurable real-time by the machine vision system during a microassembly process. By selectively configuring different arrangements of the excitation light filter lenses, the machine vision system can select to have the excitation light source optical train 604 emit excitation light in a selected excitation light wavelength range. Of course, a third alternative can be a combination of the first and second alternatives discussed above. The excitation light 606, emitted from the excitation light source optical train 604, is illuminated onto the ensemble of micro-LEDs on the planar working surface 414.

The excitation light wavelength range can vary according to different applications. In certain applications there can be a plurality of emitted excitation lights 1102, 1104, 1106, 1108, in different excitation light wavelength ranges. The plurality of excitation lights can be, in certain embodiments, uniformly illuminated onto the ensemble on the planar working surface 414 with each excitation light in the plurality individually illuminated onto the ensemble in a time division multiplexing method. Alternatively, a plurality of emitted excitation lights can be contemporaneously illuminated onto the ensemble in any combination of excitation lights. According to various methods of emitting excitation light 606 onto the ensemble, a first example emitted excitation light 606, 1102, can be in a first excitation light wavelength range 1102 in an ultraviolet (UV) wavelength range centered at about 325 nm with a tolerance of +/−10 nm. A second example emitted excitation light 606, 1104, can be in a second excitation light wavelength range 1104 extending from the near UV wavelength range to the visible light wavelength range centered at about 405 nm with a tolerance of +/−10 nm. A third example emitted excitation light 606, 1106, can be in a third excitation light wavelength range 1106 in the visible light wavelength range centered at about 480 nm with a tolerance of +/−10 nm. A fourth example emitted excitation light 606, 1108, can be in a fourth excitation light wavelength range 1108 in the visible light wavelength range centered at about 550 nm with a tolerance of +/−10 nm. These four example excitation light wavelength ranges are listed in Table 1 shown in FIG. 14. Various example methods of identifying location and orientation of a plurality of heterogeneous micro-LEDs on a planar working surface will be more fully discussed below. Some of the examples will be discussed below with reference to Table 1. It is understood that the excitation light 606 can be in different excitation light wavelength ranges other than the examples mentioned above.

With specific reference to FIG. 6, one or more excitation light sources 602, each optically coupled to an excitation light source optical train 604, can selectively be turned ON and OFF. When turned ON, an excitation light source 602 couples light therefrom into a source optical train 604.

In certain embodiments, the source optical train 604 can include one or more excitation light filter lenses that filter and pass only excitation light in a specific excitation light wavelength range. According to various embodiments, the source optical train 604 emits excitation light 606 only in a specific excitation light wavelength range. The emitted excitation light 606, according to certain embodiments, uniformly illuminates the planar working surface 414 of a microassembler backplane 416. Accordingly, all micro-objects and micro-scale devices such as micro-LEDs (also referred to as chiplets), which are disposed on the planar working surface, will also be illuminated by the incident excitation light 606.

In response to the incident excitation light 606, one or more of the heterogeneous micro-LEDs emit photoluminescence light emissions in defined photoluminescence light wavelength ranges. Each micro-LED includes specific quantum well (QW) material that is specific to the type of micro-LED device. The specific QW material will be excited by the incident excitation light 606 of certain defined wavelength range and will begin to emit photoluminescence light signals in a certain wavelength range matching a particular defined wavelength range associated with the specific quantum well material. That is, for example, in response to being excited by excitation light in a defined excitation wavelength range, a red, green, or blue, micro- LED emits photoluminescence light in a wavelength range matching a defined wavelength range of photoluminescence light emission from each of a red, green, or blue, micro-LED.

The photoluminescence light signals will continue to be emitted from the specific QW material in the micro-LED device while incident excitation light continues to excite the QW material.

For example, the green micro-LEDs 610, 612, in response to being illuminated by incident excitation light 606 within a certain wavelength range, emit photoluminescence light 650, 652, in a green micro-LED photoluminescence light wavelength range 1113. Typically, after the particular certain incident excitation light 606 is removed from illuminating the green micro-LEDs 610, 612, the green micro-LEDs 610, 612 stop emitting the photoluminescence light 650, 652. According to the example, micro-LEDs that are other than green micro-LEDs 610, 612, will not emit photoluminescence light when illuminated with incident excitation light 606 in the certain excitation light wavelength range. However, in other examples, any combination of heterogeneous micro-LEDs can be expected to emit photoluminescence light when illuminated by the same incident excitation light 606 in the certain excitation light wavelength range.

Continuing with the current example, the blue micro-LEDs 620, 622, in response to being illuminated by incident excitation light 606 within a certain wavelength range, emit photoluminescence light 660, 662, in a blue micro-LED photoluminescence light wavelength range 1112. After the particular certain incident excitation light 606 is removed from illuminating the blue micro-LEDs 620, 622, the photoluminescence light 660, 662, will stop being emitted from the blue micro-LEDs 620, 622.

Similar to the discussion above regarding the green micro-LEDs 610, 612, and the blue micro-LEDs, 620, 622, the red micro-LEDs 630, 632, in response to being illuminated by incident excitation light 606 within a certain defined wavelength range, emit photoluminescence light 670, 672, in a defined red micro-LED photoluminescence light wavelength range 1114. After the particular certain incident excitation light 606 is removed from illuminating the red micro-LEDs 630, 632, the photoluminescence light 670, 672, will stop being emitted from the red micro-LEDs 630, 632.

In certain embodiments, a fluorescent material dot 611, 615, can be embedded into a surface of an outer layer of a micro-LED (e.g., chiplet) 610, 612. The fluorescent material dot 611, 615, is outwardly exposed at an outer surface of the outer layer of the micro-LED 610, 612. After being illuminated by certain incident excitation light 606 in a certain excitation light wavelength range, the fluorescent material dot 611, emits fluorescence light 613 that can be detected by the optical sensors in the camera device 208. Optionally, in certain applications, one or more fluorescence detection filter lenses in a receiving optical train 206 can selectively pass only emitted fluorescence light 613 in a certain defined fluorescence detection wavelength range. This addition of the fluorescence detection filter lenses in the receiving optical train 206, in certain embodiments, can enhance reliability of detection of only those fluorescence light 613 emissions from the fluorescent material dot 611, while avoiding detection of other extraneous light signals which can result in detecting false positives. When the camera device 602 detects emitted fluorescence light 613 in a certain defined fluorescence detection wavelength range, according to the example, the machine vision system can determine that the chiplet is vertically oriented right-side-up on the planar working surface. That is, for example, a captured image by the camera device including emitted fluorescence light 613 in a certain defined fluorescence detection wavelength range indicates to the machine vision system that the micro-LED is vertically oriented right-side-up on the planar working surface. Of course, in certain embodiments, the detection of emitted fluorescence light 613 in a certain fluorescence detection wavelength range, would indicate to the machine vision system that a chiplet is vertically oriented upside-down on the planar working surface.

Continuing with the present example, when a fluorescent material dot 615 in a green micro-LED 612 is facing away from the receiving optical train 206, the camera device 602 will fail to detect any fluorescence light in the certain detection wavelength range which would be associated with the fluorescent material dot 615 in the green micro-LED 612. In response to the optical sensors in the camera device 206 failing to detect any fluorescence light in the certain fluorescence detection wavelength range, while also having detected photoluminescence light 652 in a green micro-LED photoluminescence light wavelength range 1113 (see FIG. 11) emitted from the green micro-LED 612, the machine vision system can determine that the particular chiplet 612 is vertically oriented upside-down. Of course, in certain embodiments, in response to failing to detect any fluorescence light in the certain detection wavelength range which would be associated with the fluorescent material dot 615 in the green micro-LED 612, the machine vision system would determine that the particular chiplet 612 is vertically oriented right-side-up on the planar working surface.

With reference to FIGS. 6 and 11, according to certain embodiments, one or more visible white light sources 602, each optically coupled to a visible white light source optical train 604, can selectively be turned ON and OFF. When turned ON, a visible white light source 602 couples visible white light 606, 1110 therefrom into a visible white light source optical train 604. The visible white light 606, 1110, is emitted from the visible white light source optical train 604 and illuminates the ensemble 608 with incident visible white light 606, 1110. Typically, visible white light 1110 is in a wavelength range of approximately 400 nm to 700 nm.

However, in certain embodiments, a variation of the visible white light 606, 1110, can be in a wavelength range that does not include certain one or more excitation light wavelength ranges. For example, the visible white light wavelength range 1110 could start above the second excitation light wavelength range 1104 and extend up to 700 nm. The visible white light wavelength range 1110, in this example, would be outside of the first excitation light wavelength range 1102 and the second excitation light wavelength range 1104. As a second example, the visible white light source optical train 604 includes one or more optical filters such that the excitation light wavelength ranges are notched out from the visible white light 606, 1110, emitted from the visible white light source optical train 604. In this way the visible white light 1110 will not interfere with the wavelength ranges of the certain one or more excitation light wavelength ranges 1102, 1104, while illuminating the ensemble 608.

It is understood that, according to certain embodiments, the above filtering (e.g., by one or more notch filters and/or by one or more bandpass filters) in the visible white light source optical train 604 could be selectively electronically activated by control from a processing system 1505 (see FIG. 15) of the machine vision system. The machine vision system in this way can turn ON-OFF the various light sources and control configuration of the filtering of emitted light from the one or more light source optical trains 604. The machine vision system thereby can control the wavelength range(s) of visible white light and/or of excitation light emitted at any particular time from each of the light source optical trains 604, that illuminate the ensemble 608 and the planar working surface 414.

The receiving optical train 206 of one or more camera devices 208, according to various embodiments, can receive the reflected visible white light 606 which was reflected from the ensemble 608 and from the planar working surface 414. The one or more sensors in the camera device 208 capture image data information from the visible white light reflections received by the receiving optical train 206.

The machine vision system, in this example, can perform image processing on the captured image data from the sensors to identify the individual micro-LEDs 610, 620, 630, 612, 622, 632, on the planar working surface 414. In one example implementation, the visible white light 606, 1110, is emitted from the visible white light source optical train 604 while no excitation light 1102, 1104, 1106, 1108, is illuminated and incident on the ensemble 608 and the planar working surface 414. In other examples, any combination of white visible light in selected different wavelength ranges and/or excitation light in one or more selected different wavelength ranges could be illuminated and incident on the ensemble 608 and the planar working surface 414.

It should be noted that the camera device 208 coupled to the receiving optical train 206, according to various embodiments, can be one or more color camera devices. The sensors of such a color camera device (e.g., a main feedback camera) can capture an image that contains color information to identify different colors of light contemporaneously received by the camera device 208 from different locations on the planar working surface 414 and that are within a field-of-view of the receiving optical train 206. As a second alternative example, or in addition to the first example comprising a main feedback color camera device, certain embodiments can include one or more special, dedicated, heterogeneous identification cameras that are each specifically configured for a special application to capture specific one or more different colors of light received from different locations on the planar working surface 414 . . . . According to third alternative example configuration, a camera device can include light sensors that capture light intensity of light signals filtered by one or more filter lenses arranged in a receiving optical train 206. The light sensors capture light intensity of received light signals within defined wavelength ranges selected by the particular configuration of the one or more filter lenses in the receiving optical train 206.

According to another example embodiment, the machine vision system can perform image processing and overlay (combine) a plurality of captured images of a same module FOV region 504 on the planar working surface, where each captured image is captured while one of a plurality of excitation lights of different wavelength ranges is ON and illuminating the same module FOV region 504 at a different time. Additionally, a captured image for the machine system to overlay can be of reflected visible white light signals captured while the visible white illuminating light is ON and illuminating the same module FOV region 504, without any of the plurality of excitation lights being turned ON.

The machine vision system can perform image processing on the various captured images and overlay the captured images of the same module FOV region 504 to generate a composite captured image of the optical module FOV region 504. The machine vision system can then perform image processing operations on the composite image to compare the various captured image data in the composite captured image to determine at least one of the location, the orientation, or the type, of each individual micro-LED in the optical module FOV region 504 on the planar working surface 414.

Figure 7:
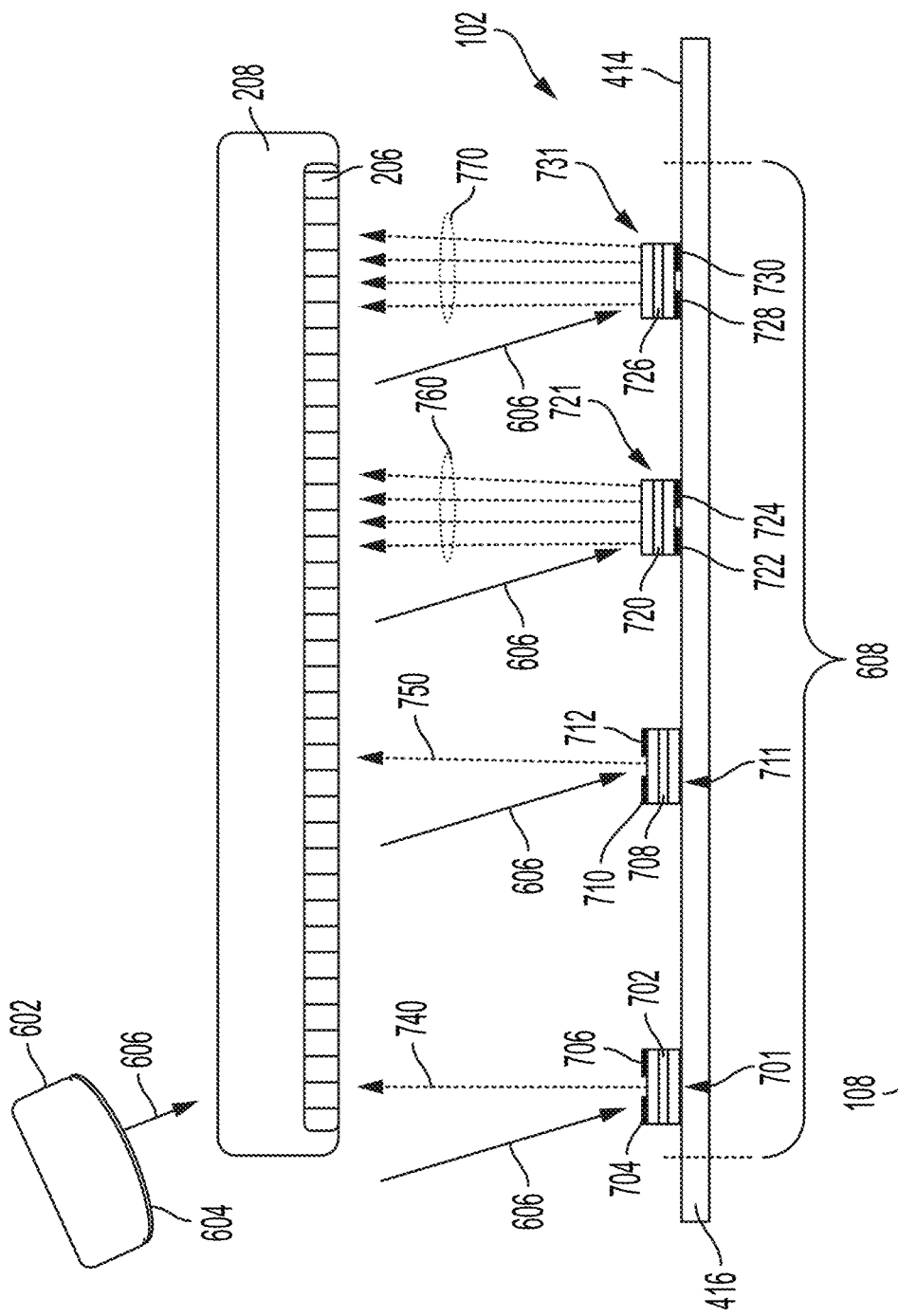
FIG. 7 is a side view of a second example machine vision system and method therefor; where in this example a random ensemble of micro-LEDs is disposed on a planar working surface, and where excitation light is illuminated on the ensemble and in response photoluminescence emissions from different micro-LEDs in the ensemble can be detected by an optical image capture module of a machine vision system thereby identifying location and orientation of individual micro-LEDs on the planar working surface.

FIG. 7 is a side view of a second example of a random ensemble 608 of micro-LEDs 701, 711, 721, 731, disposed on a planar working surface 414 of a microassembler backplane 416. In this example, two micro-LEDs 721, 731, are disposed right-side up, while two micro-LEDs 701, 711, are disposed upside-down.

The upside-down micro-LEDs 701, 711, have contact pads 704, 706, 710, 712, facing vertically up within a field-of-view of a receiving optical train 206 coupled to a camera device 208. On the other hand, the right-side up micro-LEDs 721, 731, include contact pads 722, 724, 728, 730, facing vertically down away from the field-of-view of the receiving optical train 206.

The contact pads 704, 706, 710, 712, 722, 724, 728, 730, are typically made of metal (or metallic) material. Only for simplicity of the present discussion, and not for limitation, the pads will be referred to as "metal pads". However, it is understood that these pads can be made of metallic material, metal alloy material, or other semiconductor materials with similar conductive properties except they are not made of pure metal material.

While excitation light 606 of a certain defined excitation light wavelength range is emitted from an excitation light source optical train 604, the excitation light 606 illuminates and is incident on the ensemble 608 of micro-LEDs. Each micro-LED 701, 711, 721, 731, includes quantum well material 702, 708, 720, 726, as shown. When excitation light 606 of a certain wavelength range is incident on each micro-LED, its respective quantum well material 702, 708, 720, 726, can be excited by the incident excitation light 606.

In one example scenario, all four micro-LEDs 701, 711, 721, 731, include the same type of quantum well material 702, 708, 720, 726, which will be excited by excitation light 606 of the certain wavelength range. Therefore, all four micro-LEDs 701, 711, 721, 731, will emit photoluminescence light 740, 750, 760, 770, in response to the respective quantum well material 702, 708, 720, 726, of each micro-LED being excited by the incident excitation light 606 of the certain wavelength range. For example, if all four micro-LEDs are green micro-LEDs, each of the micro-LEDs will emit the same wavelength range of photoluminescence light 1113 (see FIG. 11).

In other example combinations of heterogeneous micro-LEDs (i.e., micro-LEDs of different types) a machine vision system could selectively, optionally sequentially, turn ON a plurality of different excitation light sources 602. Each selected excitation light source 602 in the plurality can emit, from its respective excitation light source optical train 604, excitation light 606 of a certain wavelength range which is different from an excitation light wavelength range of excitation light 606 from a different excitation light source 602 in the plurality.

When a micro-LED 701, 711, 721, 731, includes quantum well material 702, 708, 720, 726, that is excited by excitation light of a particular wavelength range, the particular micro-LED 701, 711, 721, 731, will emit photoluminescence light 740, 750, 760, 770. The machine vision system can determine the type of micro-LED 701, 711, 721, 731, by the emitted photoluminescence light 740, 750, 760, 770, that is received by the receiving optical train 206 optically coupled to a camera device 208.

Additionally, the received photoluminescence light 740, 750, 760, 770, according to certain embodiments, will have different levels of intensities based on whether the respective micro-LED 701, 711, 721, 731, is vertically oriented upside-down or right-side-up. The metal pads 704, 706, 710, 712, will block the excitation light (e.g., excitation UV light) 606 reaching the quantum well material 702, 708, and block photoluminescence light 740, 750, escaping from the quantum well material 702, 708, resulting in a weaker and smaller (lower intensity) photoluminescence light 740, 750, response. The machine vision system thereby can determine from the level of intensity of the received photoluminescence light 740, 750, 760, 770, the vertical orientation of the particular micro-LED 701, 711, 721, 731.

As shown in FIG. 7, vertically oriented upside-down micro-LEDs 701, 711, will emit a lower level of intensity of photoluminescence light signals 740, 750. This lower level of intensity of emitted photoluminescence light 740, 750, is caused by the pads 704, 706, 710, 712, being on the top surface of these micro-LEDs 701, 711. The pads 704, 706, 710, 712, can be interposed between the quantum well material 702, 708, and the field-of-view of the receiving optical train 206 coupled to the camera device 208. The pads 704, 706, 710, 712, will at least partially block, and/or reduce the intensity of, excitation light 606 reaching the quantum well material 702, 708, and will at least partially block, and/or reduce the intensity of, the emitted photoluminescence light signals 740, 750, that are received by the receiving optical train 206, as shown.

As shown in FIG. 7, vertically oriented right-side-up micro-LEDs 701, 711, will emit a higher level of intensity of photoluminescence light 760, 770. This higher level of intensity of emitted photoluminescence light 760, 770, is caused by the pads 722, 724, 728, 730, being on the bottom surface of these micro-LEDs 721, 731. The pads 722, 724, 728, 730, are facing down and do not block the photoluminescence light emissions 760, 770, emitted from the quantum well material 720, 726, in these right-side-up micro-LEDs 721, 731, as shown.

Figure 8:
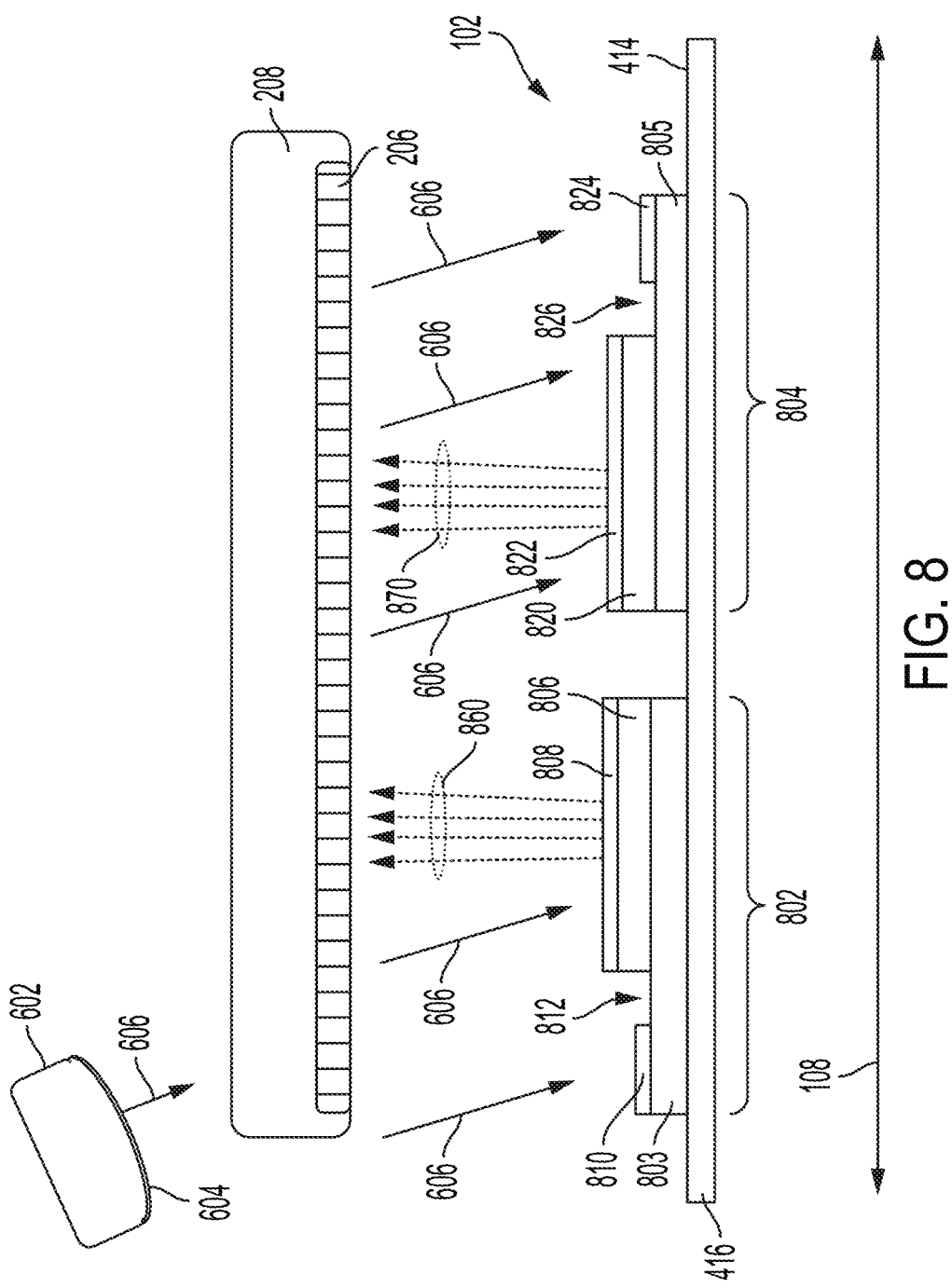
FIG. 8 is a side view of a third example machine vision system and method therefor; where in this example a random ensemble of micro-LEDs is disposed on a planar working surface, where excitation light is illuminated on the ensemble and in response photoluminescence emissions from different micro-LEDs in the ensemble can be detected by an optical image capture module of a machine vision system thereby identifying location and orientation of individual micro-LEDs on the planar working surface.

FIG. 8 is a side view of a third example of a random ensemble of micro-LEDs 802, 804, on a planar working surface 414 of a microassembler backplane 416. A machine vision system can determine the relative location of the cathode 810, 824, and the anode 808, 822, of a micro-LED chiplet by comparing a captured image of photoluminescence emissions from the chiplet 802, 804, to a captured image of reflected visible white illumination light signals from the chiplet 802, 804.

A typical micro-LED 802, 804, is a semiconductor device that has a cathode contact 810, 824, formed as a mesa structure on the semiconductor substrate by an etching process to etch away quantum well material 806, 820, such that the cathode metal pad 810, 824, can make an ohmic contact to the underlying semiconductor layer 803, 805. An underlying n-type semiconductor layer 803, 805; for example, and not for limitation, is made with gallium nitride material. Therefore, when using excitation light (e.g., UV excitation light) 606 in a certain wavelength range, the excitation light 606 excites a photoluminescence reaction from the quantum well material 806, 820. The emitted photoluminescence light 860, 870, received by the receiving optical train 204 coupled to the camera device 208, will have shape and location coinciding more with the anode 808, 822, than with the cathode 810, 824, of the micro-LED 802, 804. When the machine vision system compares a captured image of the emitted photoluminescence light 860, 870, with a captured image of reflected visible white illumination light signals that are reflected from all the surfaces of the micro-LED 802, 804, that are exposed to the visible white illumination light 606 and are reflecting the visible white illumination light within the line-of-sight of the receiving optical train 206 and the camera device 208, the machine vision system can distinguish the anode 808, 822, from the cathode 810, 824, of a micro-LED 802, 804. Additionally, a horizontal orientation of the micro-LED 802, 804, on the planar working surface 414 can be determined by the machine vision system from the shape and location of the higher intensity photoluminescence light 860, 870, mostly coinciding with the anode 808, 822, of the micro-LED 802, 804.

Figure 9:
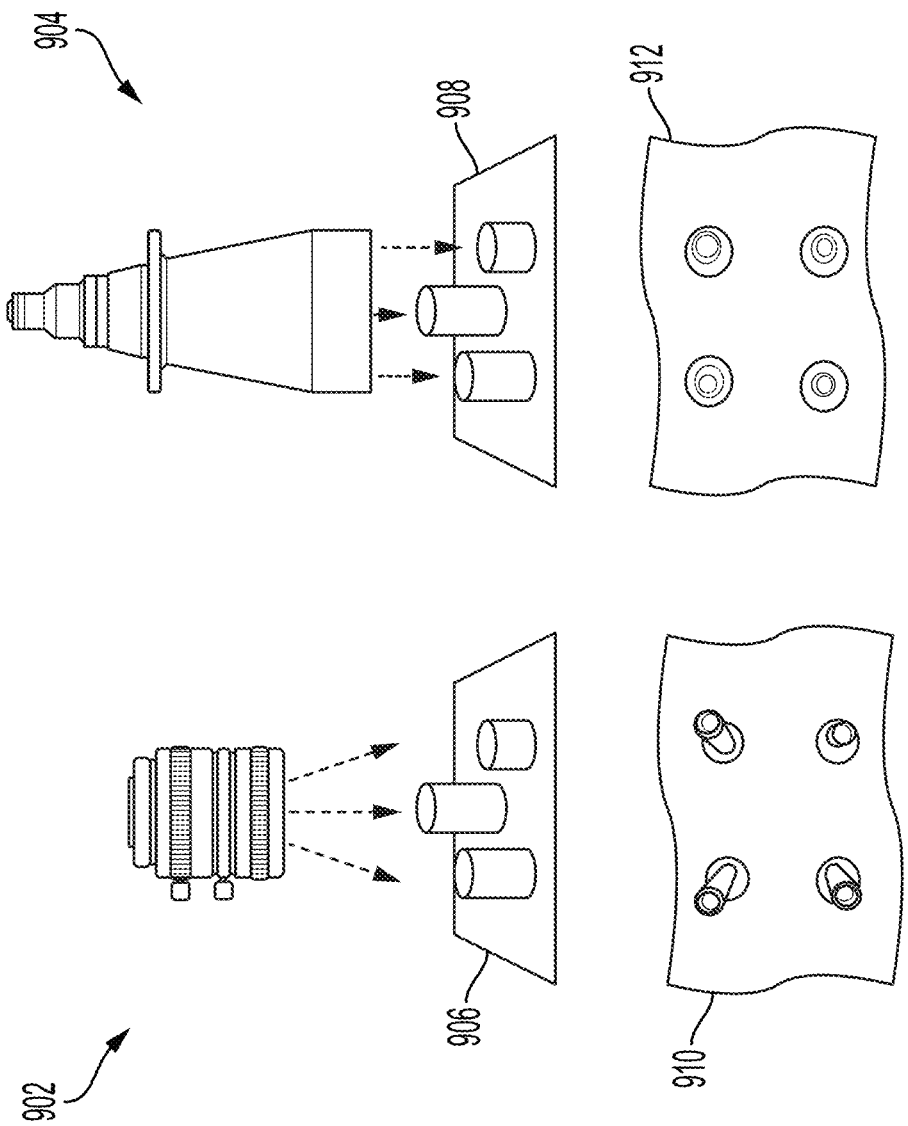
FIG. 9 is an illustration of an example image capture by an optical module with an ordinary lens compared with an example image capture by an optical module with a telecentric lens.

With reference to FIG. 9, a machine vision system according to various embodiments can include optical modules that use ordinary lenses 902 and alternatively can include optical modules that use telecentric lenses 904. It should be noted that certain embodiments could use both types of lenses 902, 904, as part of optical trains of optical modules.

An ordinary lens element 902 views objects 906 on a planar surface and couples light signals therefrom via an optical train to a camera device in which one or more optical sensors capture a module FOV image 910 as shown. A camera device using an ordinary lens element 902 can suffer various disadvantages while capturing the module FOV image 910. The disadvantages can include but are not limited to the following observations. A part of a surface of an object 906 may be hidden by surface unevenness. The magnification of the captured image 910 can change relative to the depth of the object 906. The size of the captured image can change based on the distance from the lens element 902 to the object 906 on the planar surface. The ordinary lens element 902 can cause parallax error in the captured image 910. The centroid of the object 906 in the captured image 910 changes based on the focus or defocus of the lens element 902. Blurring of the captured image 910 can vary a-symmetrically with respect to the focus or defocus of the lens element 902. The appearance of the captured image 910 can vary across the field-of-view.

On the other hand, the telecentric lens element 904 does not have a change in magnification with respect to the depth of an object. There is no parallax error. The entire surface of the object 906 is visible. The size of the captured image 912 remains the same while varying the distance from the telecentric lens element 904 to the object 908 on the planar surface. The centroid of an object remains the same with changing focus (e.g., defocus) of the lens element 904. Blurring remains symmetrical with respect to changing focus (e.g., defocus) of the lens element 904. The appearance of the captured image 912 remains constant across the field-of-view.

However, the telecentric lens element 904 typically is larger and wider than an image plane within the field-of-view of the lens element 904. This makes it difficult to stitch side-by-side module FOV images that are adjacent to each other and captured by a telecentric lens element 904. Due to the telecentric lens element 904 being larger, in certain implementations of an optical module, it can result in a longer optical train requiring greater distance between the camera device and the object 908. Note that in many cases the micro-objects will be very thin and not exhibit meaningful levels of parallax error, magnification error, or defocusing for ordinary lenses in which case the imaging performance will be essentially equivalent to that of telecentric lenses.

Figure 15:
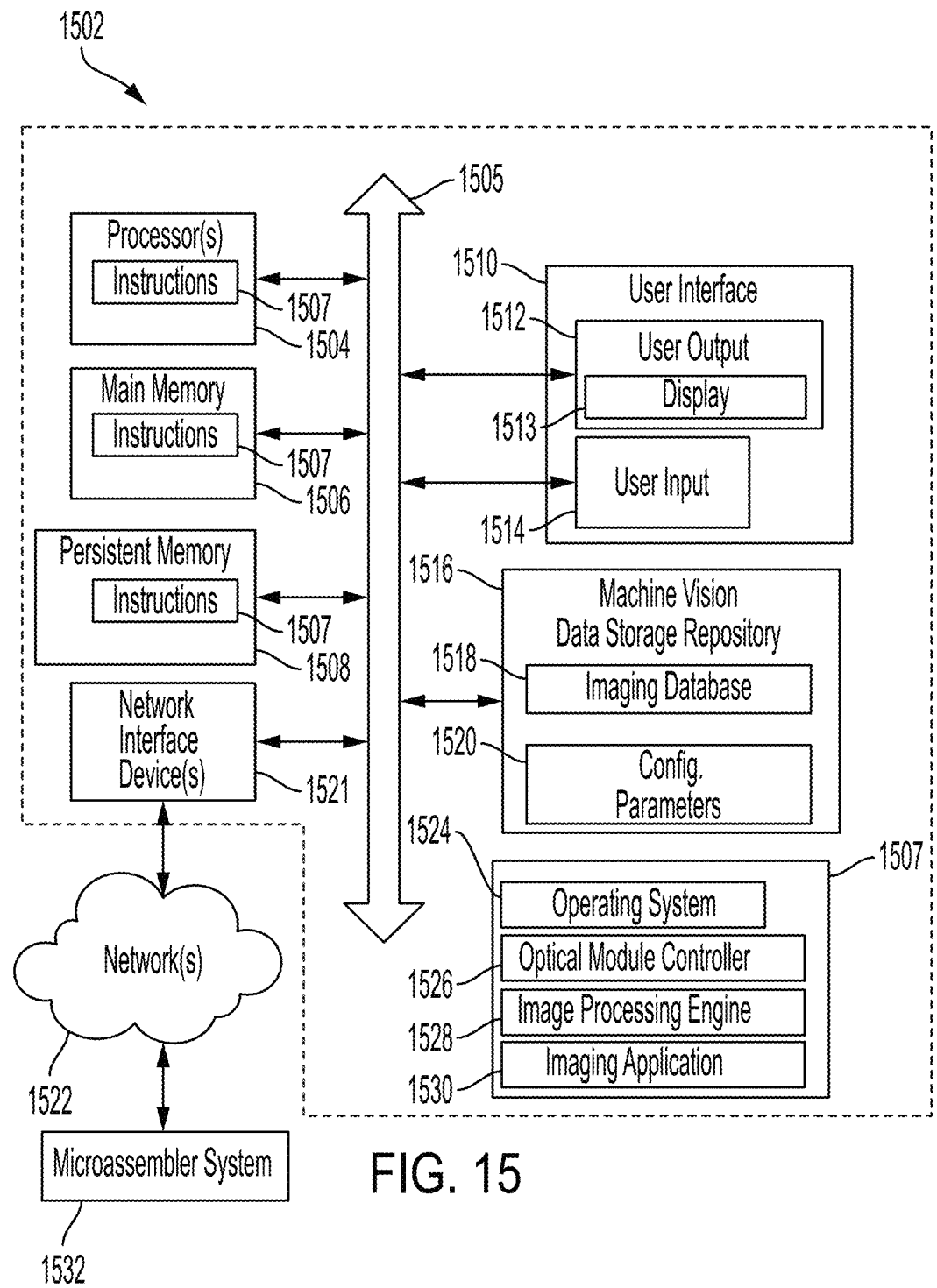
FIG. 15 is a system block diagram illustrating an example machine vision system suitable for use by a microassembler system to identify different types of micro-components on a planar working surface as part of a microassembly process, according to various embodiments of the invention.

Example of a Machine Vision System Including a Processing System Operating in a Network FIG. 15 illustrates an example of a processing system 1502 (also referred to as a computer system) suitable for use to perform the example methods discussed herein in a machine vision system communicatively coupled with a microassembler system, according to an example of the present disclosure. The processing system 1502 according to the example is communicatively coupled with a communication network 1522 which can comprise a plurality of networks. This simplified example is not intended to suggest any limitation as to the scope of use or function of various example embodiments of the invention described herein.

The example processing system 1502 comprises a computer system/server, which is operational with numerous other general purpose or special purpose computing system environments or configurations. Examples of well-known computing systems, environments, and/or configurations that may be suitable for use with such a computer system/server include, but are not limited to, personal computer systems, server computer systems, thin clients, thick clients, hand-held or laptop devices, multiprocessor systems, microprocessor-based systems, and distributed cloud computing environments that include any of the above systems and/or devices, and the like.

The processing system 1502 may be described in a general context of computer system executable instructions, such as program modules, being executed by a computer system. Generally, program modules may include methods, functions, routines, programs, objects, components, logic, data structures, and so on that perform particular tasks or implement particular abstract data types. A processing system 1502, according to various embodiments, may be practiced in distributed networking environments where tasks are performed by remote processing devices that are linked through a communications network.

Referring more particularly to FIG. 15, the following discussion will describe a more detailed view of an example processing system 1502. According to the example, at least one processor 1504 is communicatively coupled with system main memory 1506 and persistent memory 1508.

A bus architecture 1505 facilitates communicative coupling between the at least one processor 1504 and the various component elements of the processing system 1502. The bus architecture 1505 represents one or more of any of several types of bus structures, including a memory bus, a peripheral bus, an accelerated graphics port, and a processor bus or local bus using any of a variety of bus architectures.

The system main memory 1506, in one example, can include computer system readable media in the form of volatile memory, such as random access memory (RAM) and/or cache memory. By way of example only, a persistent memory storage system 1508 can be provided for reading from and writing to any one or more of: a non-removable, non-volatile magnetic media (not shown and typically called a "hard drive"), or a solid state drive (SSD) (also not shown), or both. In such instances, each persistent memory storage system 1508 can be connected to the bus architecture 1505 by one or more data media interfaces. As will be further depicted and described below, the at least one processor 1504, the main memory 1506, and the persistent memory 1508, may include a set (e.g., at least one) of program modules 1507 that can be configured to carry out functions and features of various embodiments of the invention.

A program/utility, having a set (at least one) of program modules, may be stored in persistent memory 1508 by way of example, and not limitation, as well as an operating system 1524, one or more application programs or applications 1530, other program modules, and program data. Each of the operating system 1524, one or more application programs 1530, other program modules, and program data, or some combination thereof, may include an implementation of interface software to a networking environment. Program modules generally may carry out the functions and/or methodologies of various embodiments of the invention as described herein.

The at least one processor 1504 is communicatively coupled with one or more network interface devices 1521 via the bus architecture 1505. The network interface device 1521 is communicatively coupled, according to various embodiments, with one or more networks 1522. The network interface device 1521 can communicate with one or more networks 1522 such as a local area network (LAN), a general wide area network (WAN), and/or a public network (e.g., the Internet). The network interface device 1521, according to the example, facilitates communication between the processing system 1502 and other nodes in the network(s) 1522. One such node, according to various embodiments, includes a microassembler system 1532 that communicates with the machine vision system comprising the processing system 1502.

A user interface 1510 is communicatively coupled with the at least one processor 1504, such as via the bus architecture 1505. The user interface 1510, according to the present example, includes a user output interface 1512 and a user input interface 1514. Examples of elements of the user output interface 1512 can include a display 1513, a speaker, one or more indicator lights, one or more transducers that generate audible indicators, and a haptic signal generator. Examples of elements of the user input interface 1514 can include a keyboard, a keypad, a mouse, a track pad, a touch pad, and a microphone that receives audio signals. The received audio signals, for example, can be converted to electronic digital representation and stored in memory, and optionally can be used with voice recognition software executed by the processor 1504 to receive user input data and commands.

Computer instructions 1507 can be at least partially stored in various locations in the processing system 1502. For example, at least some of the instructions 1507 may be stored in any one or more of the following: in an internal cache memory in the one or more processors 1504, in the main memory 1506, and in the persistent memory 1508.

The instructions 1507, according to the example, can include computer instructions, data, configuration parameters 1520, and other information that can be used by the at least one processor 1504 to perform features and functions of the processing system 1502 and of the machine vision system. According to the present example, the instructions 1507 include an optical module controller 1526 which operates to control one or more optical modules of the machine vision system. The instructions 1507 also include an image processing engine 1528 which operates to process images captured by the one or more optical modules of the machine vision system. The instructions 1507 also include an imaging application 1530 which performs features and functions of the machine vision system and how it interoperates with a microassembler system 1532. The instructions 1507 also include a set of configuration parameters that can be used by the optical module controller 1526, the image processing engine 1528, and the imaging application 1530, as further discussed herein. Additionally, the instructions 1507 include configuration data for the processing system 1502.

The at least one processor 1504, according to the example, is communicatively coupled with a Machine Vision Data Storage Repository 1516 (also referred to herein as the MVDR 1516). The MVDR 1516 can store data for use by the image processing engine 1528 and the imaging application 1530, and related methods, which can include an imaging database 1518 that can store at least a portion of one or more captured image data sets, image processing information from the image processing engine 1528, and history information associated with captured image data sets, image processing algorithms, and associated parameter settings. Various functions and features of one or more embodiments of the present invention, as have been discussed above, may be provided with use of the data stored in the MVDR 1516.

Several Example Methods of Operation in a Machine Vision System

Figure 12:
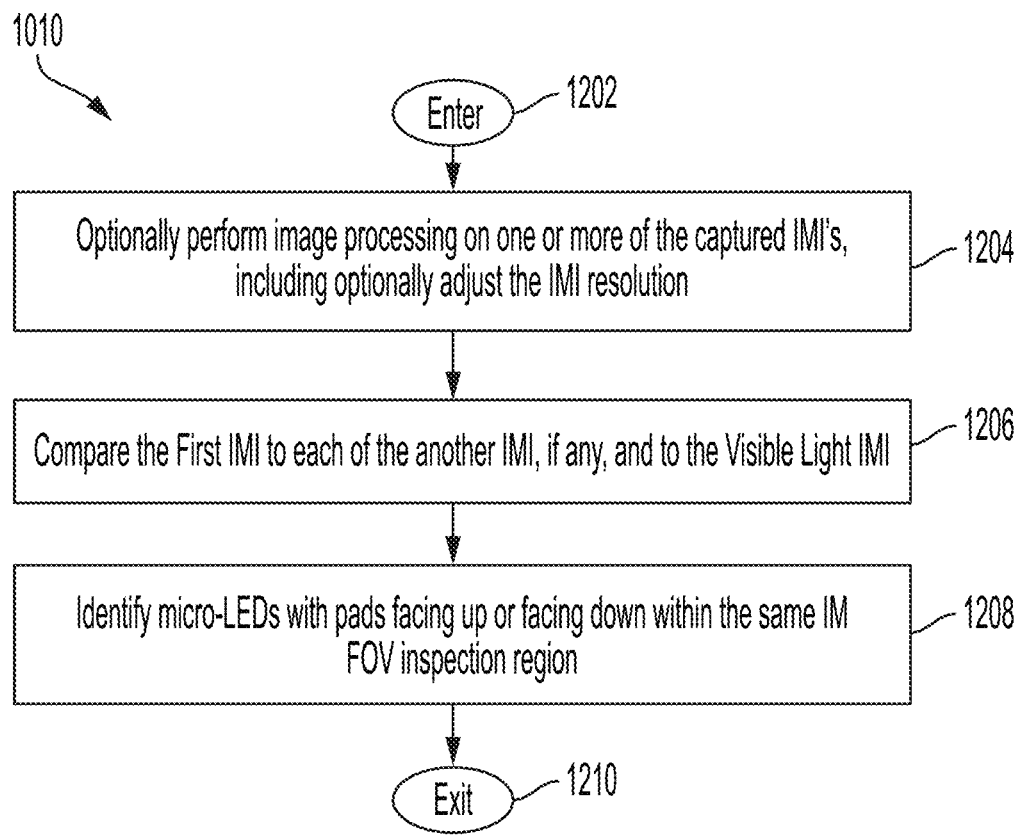
FIGS. 12 and 13 are operational flow diagrams illustrating alternative examples of operations of a machine vision system suitable for use by a microassembler system to identify different types of micro-components on a planar working surface to provide optical feedback signals to a microassembler system as part of a microassembly process.
Figure 13:
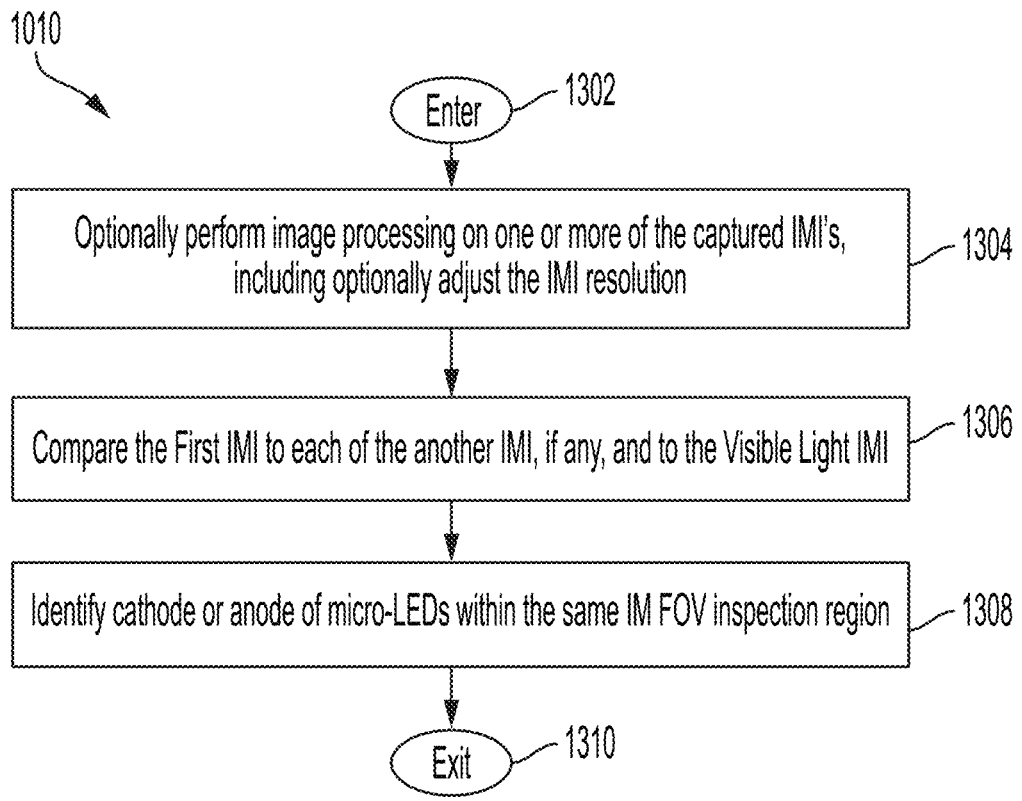

FIGS. 10, 12, and 13, are operational flow diagrams illustrating example methods of operation of a machine vision system including a processing system 1502 such as shown in FIG. 15. Certain example methods of operation of a machine vision system will be more fully discussed below.

Figure 10A:
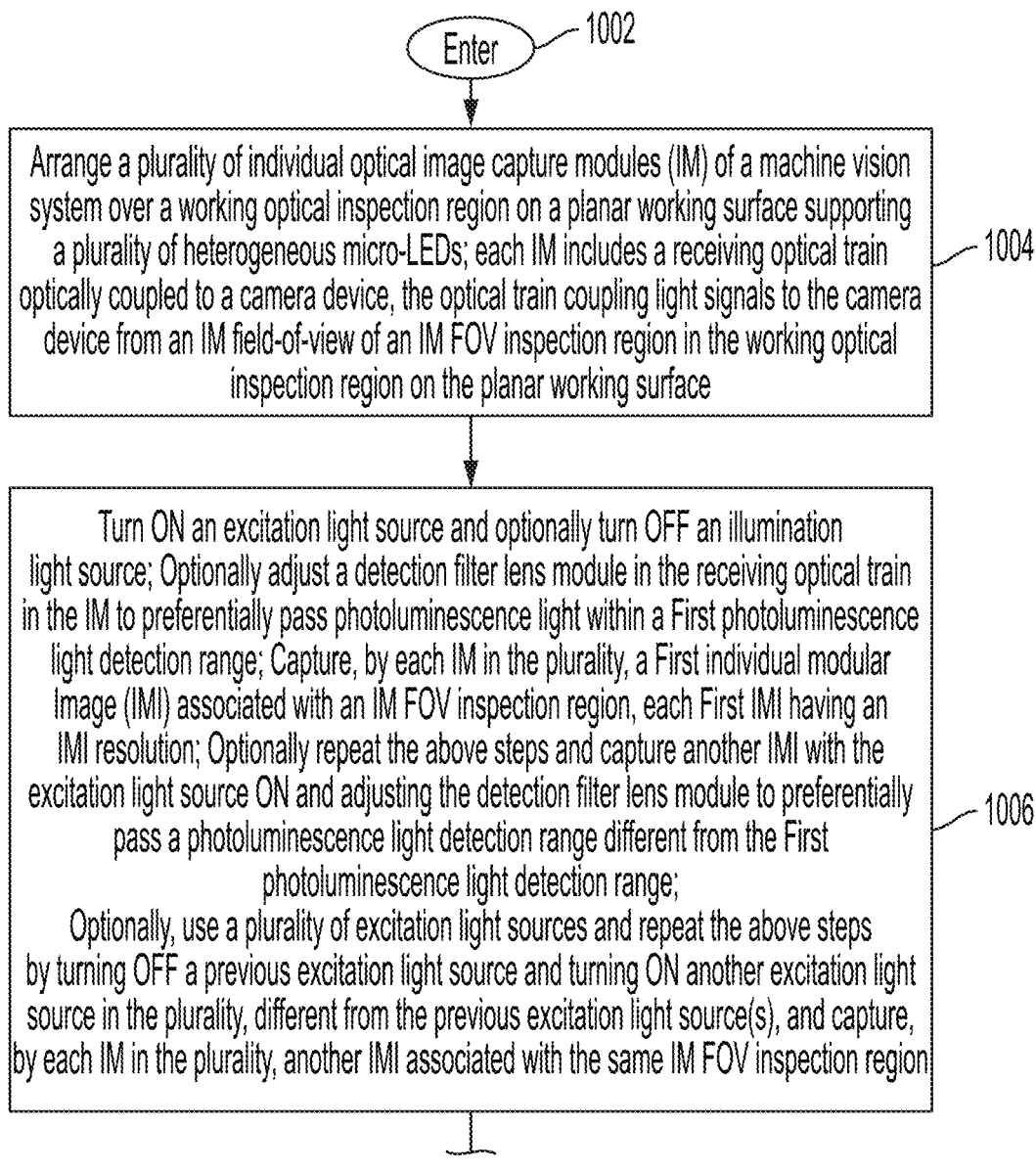
FIGS. 10A and 10B comprise an operational flow diagram illustrating an example set of operations of a method performed by a machine vision system to identify different types of micro-components on a planar working surface and thereby to provide optical feedback signals to a microassembler system as part of a microassembly process.
Figure 10B:
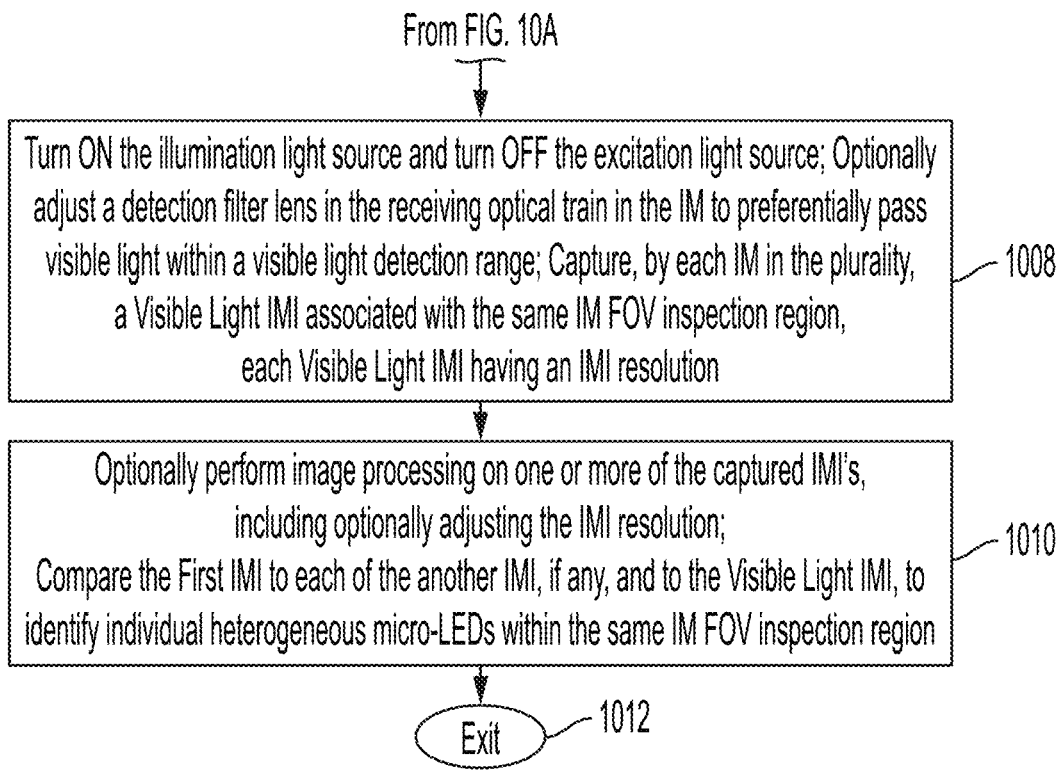

As a first example, the at least one processor 1504 in the processing system 1502 enters the operational sequence shown in FIGS. 10A and 10B. FIGS. 12 and 13 will illustrate alternative methods of operation for the machine vision system, and will be discussed further below.

With reference to FIG. 10A, the processor 1504 in the processing system 1502 enters the operational sequence, at step 1002, and proceeds to step 1004. The processor 1504, at step 1004, interoperates with the optical module controller 1526 and arranges a plurality of individual optical image capture modules (IM) 204 (e.g., an array of individual optical image capture modules 302) of the machine vision system over a working optical inspection region 108, 110, on a planar working surface 414 supporting a plurality of heterogeneous micro-LEDs. Each IM 204 includes a receiving optical train 206 optically coupled to a camera device 208, the optical train 206 couples light signals to the camera device from an IM field-of-view of an IM FOV inspection region 210, 212, in the working optical inspection region 108, 110, on the planar working surface 414.

The processor 1504, at step 1006, turns ON an excitation light source 602 and in certain embodiments also turns OFF an illumination light source. Optionally, the processor 1504 adjusts a detection filter lens module in the receiving optical train 206 in the IM 204 to preferentially pass photoluminescence light within a first photoluminescence light detection range 112, 113, 114. The processor 1504, then interoperates with the optical module controller 1526 and captures, by each IM 204 in the plurality, a first individual modular image (IMI) 504 associated with an IM FOV inspection region 210, 212. Each IMI 504 has an IMI resolution. Optionally, the processor 1504, in step 1006, repeats the above steps and captures another IMI with the excitation light source ON and adjusting the detection filter lens module to preferentially pass a photoluminescence light detection range 1112, 1113, 1114, which is different from the first photoluminescence light detection range 1112, 1113, 1114.

Optionally, the processor 1504 controls a plurality of excitation light sources 602 and repeats the above steps by turning OFF a previous excitation light source and turning ON another excitation light source in the plurality, which emits an excitation light that is different from the excitation light emitted by the previous excitation light source(s), and then the processor 1504 captures by each IM 204 in the plurality 302, another IMI associated with the same IM FOV inspection region 210, 212.

Continuing with the example operational sequence in FIG. 10B, the processor 1504, at step 1008, turns ON the visible white light illumination light source 602, and turns OFF the excitation light source(s). Optionally, the processor 1504 adjusts a detection filter lens in the receiving optical train 206 in the IM 204 to preferentially pass visible white light within a visible light detection range 1110. The processor 1504, then captures, by each IM 204 in the plurality 302, a visible white illumination light IMI 504 associated with the same IM FOV inspection region 210, 212. Each visible white illumination light IMI 504 has an IMI resolution.

The processor 1504, at step 1010, optionally interoperates with the image processing engine 1528 and performs image processing on one or more of the captured IMI's 504, including optionally adjusting the IMI resolution.

The processor 1504, interoperating with the imaging application 1530, then compares the first IMI 504 to each of the another IMI 504, if any, and to the visible white light IMI 504, to identify individual heterogeneous micro-LEDs 610, 620, 630, 612, 622, 632, within the same IM FOV inspection region 210, 212. The processor 1504 then, at step 1012, exits the operational sequence. See the discussion above with reference to FIG. 6 for a more detailed description of this method.

Referring now to FIG. 12, another example method of operation for the machine vision system includes all the steps in FIG. 10B, except replaces step 1010 with the following operational sequence. The processor 1504, upon entering this operational sequence, at step 1010, 1202, proceeds immediately to step 1204, in which the processor 1504, interoperating with the image processing engine 1528, optionally can perform image processing on one or more of the captured IMI's 504, including optionally adjusting the IMI resolution.

Continuing with the operational sequence, at step 1206, the processor 1504, interoperating with the imaging application 1530, compares the first IMI 504 to each of the another IMI 504, if any, and to the visible white light IMI 504. The processor 1504, at step 1208, then identifies micro-LEDs with pads facing up or facing down within the same IM FOV inspection region 210, 212. The processor 1504 then, at step 1210, exits the operational sequence. See the discussion above with reference to FIG. 7 for a more detailed description of this method.

Referring now to FIG. 13, another example method of operation for the machine vision system includes all the steps in FIG. 10B, except replaces step 1010 with the following operational sequence. The processor 1504, upon entering this operational sequence, at step 1010, 1302, proceeds immediately to step 1304, in which the processor 1504, interoperating with the image processing engine 1528, optionally can perform image processing on one or more of the captured IMI's 504, including optionally adjusting the IMI resolution.

Continuing with the operational sequence, at step 1306, the processor 1504, interoperating with the imaging application 1530, compares the first IMI 504 to each of the another IMI 504, if any, and to the visible white illumination light IMI 504. The processor 1504, at step 1308, then identifies the cathode 810, 824, and/or the anode 808, 822, of micro-LEDs 802, 804, within the same IM FOV inspection region 504. With the identification of the cathode and the anode, optionally, the processor 1504 can also identify a horizontal orientation of the particular micro-LED on the planar working surface. The processor 1504 then, at step 1310, exits the operational sequence. See the discussion above with reference to FIG. 8 for a more detailed description of this method.

Referring now to FIG. 14 and therein Table 1, various example methods of operation for a machine vision system will be discussed below. In these various methods, a machine vision system can discriminate between different types of micro-LEDs chiplets and can determine their vertical orientations on the planar working surface 414 by illuminating the ensemble of heterogeneous chiplets 608 with certain wavelength ranges of excitation light.

Based on the wavelength range of the illuminated excitation light incident on the micro-LED chiplets on the planar working surface 414, and the wavelength range of the detected photoluminescence light emissions from the micro-LEDs, the machine vision system can determine the type of micro-LED emitting the photoluminescence light and their vertical orientation.

To illustrate a first example method, please refer to the two rows in Table 1 labeled 325 nm and 405 nm. The row labeled 325 nm indicates that an excitation light, illuminated and incident on the micro-LED chiplets 701, 711, 721, 731, is in a wavelength range of approximately 325 nm, with a tolerance of +/−10 nm. The row labeled 405 nm indicates that an excitation light, illuminated and incident on the micro-LED chiplets 701, 711, 721, 731, is in a wavelength range of approximately 405 nm, with a tolerance of +/−10 nm.

By alternatively illuminating with a first excitation light 1102 in a wavelength range of approximately 325 nm and with a second excitation light 1104 in a wavelength range of approximately 405 nm, and comparing the received photoluminescence light emissions from individual micro-LEDs under alternative excitation by each of the two excitation lights 1102, 1104, can be seen in Table 1 that a machine vision system can determine the vertical orientation (e.g., whether right-side-up or upside-down) for individual micro-LED chiplets 701, 711, 721, 731.

The column for epitaxial layer side up indicates that the micro-LED 721, 731, has its metal pads 722, 724, 728, 730, facing down, away from the receiving optical train 206. The column for epitaxial layer side down indicates that the micro-LED 701, 711, has its metal pads facing up, interposed between the quantum well material 702, 708, and the receiving optical train 206. Under each of the two columns for epitaxial layer vertical orientation there are three columns to indicate the type of (i.e., blue, green, or red) micro-LED 701, 711, 721, 731.

With the epitaxial layer side is up, the micro-LED emits photoluminescence light from its quantum well toward the receiving optical train 206 coupled to the camera device 204. On the other hand, when the epitaxial layer side is down, the receiving optical train 206 will not receive photoluminescence light emission from the quantum well of the micro-LED.

In a second example method, a machine vision system can combine alternative illumination of various excitation light wavelengths to identify the type of micro-LED. When illuminating with a particular excitation light wavelength range, the machine vision system uses its optical sensors in its camera device 204 and optical filters in its receiving optical train 206 to detect the photoluminescence light wavelength range that is emitted from the micro-LED.

For example, the machine vision system can identify a green micro-LED type by illuminating the micro-LED with an excitation light 1106 in a wavelength range of approximately 480 nm and separately with an excitation light 1108 in a wavelength range of approximately 550 nm. The captured image under the first excitation light 1106 of 480 nm can be compared to the captured image under the second excitation light 1108 of 550 nm. A green type of micro-LED is identified by detecting photoluminescence light emissions while illuminated under the first excitation light 1106, and not detecting photoluminescence light emissions while illuminated under the second excitation light 1108. The intensity response of photoluminescence light from the micro-LED is sufficient to identify the type of micro-LED (e.g., whether the micro-LED is red, green, or blue). No spectral analysis is needed. This significantly reduces the amount of computational overhead necessary by a machine vision system to efficiently identify large numbers of micro-LED's on a planar working surface 414.

In a third example method, a machine vision system can illuminate with excitation light 1104 in a wavelength range of approximately 405 nm, with a tolerance of +/−10 nm. The machine visions system can then use a spectrum analyzer to capture the various wavelengths of photoluminescence light 1112, 1113, 1114, emitted from the various micro-LED's. The particular wavelength of photoluminescence light from a micro-LED will indicate the type of micro-LED (e.g., whether the micro-LED is red, green, or blue).

It is understood that the above provided (also see Table 1 in FIG. 14) example defined excitation light wavelength ranges are non-limiting examples of excitation light wavelength ranges. Other excitation light wavelength ranges can alternatively be successfully used by a machine vision system, according to various embodiments. Additionally, consider that excitation light wavelength ranges above or below band gap of, for example, GaN (gallium nitride) and InGaN (indium gallium nitride) quantum well material can also cause a photoluminescence light response from certain micro-LEDs.

Non-Limiting Examples

The present invention may be implemented as a system and/or a method, at any possible technical detail level of integration. A computer program may include computer readable program instructions thereon for causing a processor to carry out aspects of the present invention.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on a user's computer, partly on a user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer programs, according to various embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special-purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer programs, according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method with a machine vision system for providing optical feedback signals to a microassembler system in a microassembly process, the method comprising:
selectively turning ON a first excitation light source selected from a plurality of excitation light sources including the first excitation light source and a second excitation light source, each of the plurality of excitation light sources being respectively optically coupled to an excitation light source optical train;
optically coupling first excitation light from the selected first excitation light source into an excitation light source optical train optically coupled thereto, and passing and directing first emitted excitation light in a first defined excitation light wavelength range from the excitation light source optical train to illuminate an individual optical module field-of-view (FOV) region, also referred to as a module FOV region, on a planar working surface of a microassembler backplane;
receiving, by a receiving optical train while the selected first excitation light source is ON, light from the module FOV region, the received light including photoluminescence light signals emitted from one or more micro-LEDs in the module FOV region, and capturing a first image of the received light including the photoluminescence light signals;
selectively turning ON the second excitation light source and turning OFF the first excitation light source;
optically coupling second excitation light from the selected second excitation light source into an excitation light source optical train optically coupled thereto, and passing and directing emitted second excitation light from the excitation light source optical train in a second defined excitation light wavelength range, different from the first defined excitation light wavelength range, to illuminate the module FOV region;
receiving, by the receiving optical train while the selected second excitation light source is ON, light from the module FOV region, the received light including photoluminescence light signals emitted from the one or more micro-LEDs in the module FOV region, and capturing a second image of the received light including the photoluminescence light signals; and
performing image processing on at least one of the captured first image and the captured second image, and comparing the captured first image to the captured second image to identify at least one of: a location, an orientation, or a type, of at least one micro-LED of the one or more micro-LEDs in the module FOV region.

2. The method of claim 1, wherein the performing image processing includes overlaying the captured first image and the captured second image to generate a composite image of the module FOV region, and the comparing comprises comparing the captured first image in the composite image to the captured second image in the composite image, to identify at least one of: a location, an orientation, or a type, of each of the one or more micro-LEDs in the module FOV region.

3. The method of claim 1, wherein the one or more micro-LEDs include at least one red micro-LED, green micro-LED, or blue-micro-LED, and the first defined excitation light wavelength range of the first excitation light is selected from a plurality of defined different excitation light wavelength ranges to excite quantum well material in the at least one red, green, or blue, micro-LED, and in response to being excited by the first excitation light the red, green, or blue, micro-LED emits photoluminescence light in a wavelength range matching a defined wavelength range of photoluminescence light emission from each of a red, green, or blue, micro-LED, and the method comprising:
receiving, by the receiving optical train while the selected first excitation light source is ON and illuminating the one or more micro-LEDs with the first excitation light in the first defined excitation light wavelength range, light from the module FOV region, the received light including photoluminescence light signals emitted from the at least one red micro-LED, green micro-LED, or blue-micro-LED, and capturing the first image, with a camera device, of received light including the photoluminescence light signals.

4. The method of claim 1, comprising:
selectively turning ON an illumination light source and turning OFF the second excitation light source, optically coupling visible white or NIR illumination light from the illumination light source into an illumination light source optical train, and directing emitted visible white illumination light from the illumination light source optical train to illuminate the module FOV region;
receiving, by the receiving optical train while the illumination light source is ON, light from the module FOV region, the received light including reflected visible white or NIR illumination light signals reflected from the one or more micro-LEDs in the module FOV region, and capturing a third image of the received light including the reflected visible white or NIR illumination light signals; and
performing image processing on at least one of the first captured image, the second captured image, or the third captured image, and comparing the captured third image to the captured second image and the captured first image, to identify at least one of: a location, an orientation, or a type of, each of the one or more micro-LEDs in the module FOV region.

5. The method of claim 1, comprising:
determining, based on the comparing, an identification of at least one of a location, an orientation, or a type, of at least one micro-LED in the one or more micro-LEDs in the module FOV region on the planar working surface.

6. The method of claim 5, comprising:
providing image-data based optical feedback signals from the machine vision system to a microassembler system as part of a microassembly process, the image-data based optical feedback signals including at least one of the identified location, the identified orientation, or the identified type, of the at least one micro-LED in the one or more micro-LEDs disposed in the module FOV region on the planar working surface.

7. The method of claim 5, wherein the determining comprises:
   determining an identification of a location of a cathode and/or an anode of the at least one micro-LED in the module FOV region, and determining an identification of a horizontal orientation of the at least one micro-LED in the module FOV region, based on the identification of the location of a cathode and/or an anode of the at least one micro-LED.

8. The method of claim 5, wherein at least one micro-LED in the one or more micro-LEDs includes a fluorescent material dot embedded into a surface of an outer layer of the micro-LED, and the method comprises:
   receiving, by the receiving optical train while the excitation light source is ON, light from the module FOV region, the received light including fluorescence light signals in a certain defined fluorescence wavelength range which are emitted from the fluorescent material dot in the surface of the micro-LED, and capturing the first image of the received light including the fluorescence light signals; and
   determining, based on the comparing, that the captured first image includes emitted fluorescence light in the certain defined fluorescence wavelength range and thereby identification of vertical orientation of the at least one micro-LED in the module FOV region on the planar working surface.

9. A method for operating a machine vision system for use with a microassembler system for inspection of assembly of micro-objects on a planar working surface, the method comprising:
   providing an individual optical-image-capture module including a receiving optical train and a camera device optically coupled to the receiving optical train, and which has a module field-of-view (FOV);
   providing at least one excitation light source optically coupled to a respective at least one excitation light source optical train, the excitation light source being selectively operable including turning ON or OFF the excitation light source;
   providing an illumination light source optically coupled to an illumination light source optical train, the illumination light source being selectively operable including turning ON or OFF the excitation light source;
   turning ON the excitation light source and illuminating with incident excitation light, emitted from the excitation light source optical train, a module field-of-view (FOV) region on a planar working surface of a microassembler backplane, the module FOV region associated with the individual optical-image-capture module;
   capturing a first image, with the camera device, of light signals received by the receiving optical train from the module FOV region, the received light signals including photoluminescence light signals emitted from a quantum well material of one or more micro-LEDs disposed in the module FOV region while the excitation light source is ON;
   turning ON the illumination light source, turning OFF the excitation light source, and illuminating with incident visible white or NIR illumination light, emitted from the illumination light source optical train, the module FOV region on the planar working surface;
   capturing a second image, by the camera device, of light signals received by the receiving optical train from the module FOV region, the light signals including reflected visible white or NIR illumination light signals reflected from the one or more micro-LEDs in the module FOV region while the illumination light source is ON;
   comparing the captured first image to the captured second image to identify at least one of:
      1) a location in the module FOV region of the source of the emitted photoluminescence light signals emitted from each of the one or more micro-LEDs;
      2) an intensity of the photoluminescence light signals emitted from each of the one or more micro-LEDs; or
      3) a wavelength range of the photoluminescence light signals, emitted from each of the one or more micro-LEDs, matching a defined wavelength range of photoluminescence light emission from each of a plurality of types of micro-LEDs that can be included in the one or more micro-LEDs; and
   determining, based on the comparing, an identification of at least one of a location, an orientation, or a type, of at least one micro-LED in the one or more micro-LEDs in the module FOV region on the planar working surface; and
   providing image-data based optical feedback signals from the machine vision system to a microassembler system as part of a microassembly process, the image-data based optical feedback signals including at least one of an identified location, an identified orientation, or an identified type, of the at least one micro-LED in the one or more micro-LEDs.

10. The method of claim 9, wherein the comparing comprises:
   overlaying the captured first image and the captured second image to generate a composite image of the module FOV region, and comparing the captured first image in the composite image to the captured second image in the composite image, to identify at least one of: a location, an orientation, or a type, of each of the one or more micro-LEDs in the module FOV region.

* * * * *